(12) United States Patent
Furuta et al.

(10) Patent No.: US 9,834,633 B2
(45) Date of Patent: Dec. 5, 2017

(54) LIQUID REPELLENT COMPOSITION, LIQUID REPELLENT PROCESSING METHOD, AND ARTICLE HAVING LIQUID REPELLENT FILM

(75) Inventors: Shoji Furuta, Chiyoda-ku (JP); Minako Shimada, Chiyoda-ku (JP); Kyouichi Kaneko, Chiyoda-ku (JP); Kazunori Sugiyama, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 705 days.

(21) Appl. No.: 12/212,716

(22) Filed: Sep. 18, 2008

(65) Prior Publication Data

US 2009/0085001 A1 Apr. 2, 2009

Related U.S. Application Data

(63) Continuation of application No. PCT/JP2007/056984, filed on Mar. 29, 2007.

(30) Foreign Application Priority Data

Mar. 30, 2006 (JP) .................. 2006-092929

(51) Int. Cl.
C08F 220/24 (2006.01)
C09D 133/16 (2006.01)
C09K 3/18 (2006.01)
D06M 15/277 (2006.01)
C08F 220/18 (2006.01)
C08F 220/32 (2006.01)
C08F 220/36 (2006.01)
C08L 33/16 (2006.01)

(52) U.S. Cl.
CPC .......... C08F 220/24 (2013.01); C09D 133/16 (2013.01); C09K 3/18 (2013.01); D06M 15/277 (2013.01); *C08F 220/18* (2013.01); *C08F 2220/325* (2013.01); *C08F 2220/365* (2013.01); *C08L 33/16* (2013.01); *C08L 2205/02* (2013.01); *D06M 2200/11* (2013.01); *D06M 2200/12* (2013.01)

(58) Field of Classification Search
CPC .... C08F 220/24; C08L 2205/02; C08L 33/16; C09D 133/16
USPC .......... 524/543, 544, 545, 546, 556
See application file for complete search history.

(56) References Cited

U.S. PATENT DOCUMENTS

| | | | |
|---|---|---|---|
| 5,057,577 A * | 10/1991 | Matsuo et al. | 525/276 |
| 5,387,640 A | 2/1995 | Michels et al. | |
| 5,431,852 A * | 7/1995 | Kaijou | 516/55 |
| 6,177,531 B1 | 1/2001 | Shimada et al. | |
| 6,315,822 B1 | 11/2001 | Oharu et al. | |
| 6,590,035 B2 | 7/2003 | Shimada et al. | |
| 6,624,268 B1 * | 9/2003 | Maekawa et al. | 526/245 |
| 6,646,043 B2 * | 11/2003 | Funaki et al. | 524/800 |
| 6,653,376 B2 | 11/2003 | Sugimoto et al. | |
| 6,716,944 B2 | 4/2004 | Maekawa et al. | |
| 6,720,371 B2 | 4/2004 | Furuta et al. | |
| 6,860,926 B2 | 3/2005 | Ishikawa et al. | |
| 6,872,324 B2 | 3/2005 | Maekawa et al. | |
| 2003/0130457 A1 * | 7/2003 | Maekawa et al. | 526/242 |
| 2005/0004337 A1 | 1/2005 | Furuta et al. | |
| 2005/0267241 A1 * | 12/2005 | Sugimoto | C08F 220/22 524/366 |
| 2006/0205864 A1 | 9/2006 | Yamamoto et al. | |
| 2007/0015867 A1 | 1/2007 | Maekawa et al. | |
| 2007/0249876 A1 | 10/2007 | Furuta et al. | |
| 2008/0076862 A1 | 3/2008 | Sugimoto et al. | |

FOREIGN PATENT DOCUMENTS

| | | |
|---|---|---|
| JP | 62-179517 | 8/1987 |
| JP | 02-001795 | 1/1990 |
| JP | 05-279541 | 10/1993 |
| JP | 07-173025 | 7/1995 |
| JP | 07-278442 | 10/1995 |
| JP | 08-109580 | 4/1996 |
| JP | 10-081873 | 3/1998 |
| JP | 10-237133 | 9/1998 |
| JP | 2000-160148 | 6/2000 |
| JP | 2000-282015 | 10/2000 |
| JP | 2002-201463 | 7/2002 |
| JP | 2004-352976 | 12/2004 |
| WO | 01-32800 | 5/2001 |
| WO | 2005-023734 | 3/2005 |

OTHER PUBLICATIONS

U.S. Appl. No. 12/607,134, filed Oct. 28, 2009, Sugiyama, et al.
U.S. Appl. No. 12/731,489, filed Mar. 25, 2010, Sugiyama, et al.
U.S. Appl. No. 14/611,817, filed Feb. 2, 2015, Shimada, et al.
U.S. Appl. No. 14/628,398, filed Feb. 23, 2015, Kaneko, et al.

* cited by examiner

*Primary Examiner* — Karuna P Reddy
(74) *Attorney, Agent, or Firm* — Oblon, McClelland, Maier & Neustadt, L.L.P.

(57) ABSTRACT

To provide a liquid repellent composition which is excellent in liquid repellency and durability and an article having a liquid repelling film. A liquid repellent composition comprising a copolymer (I) and a copolymer (II), characterized in that the copolymer (I) containing from 65 to 95 mass % of a polymerized unit (a) (referred to as "$[a_1]$") and from 1 to 30 mass % of a polymerized unit (b); and the copolymer (II) containing from 25 to 80 mass % of a polymerized unit (a) (referred to as "$[a_2]$") and from 1 to 50 mass % of a polymerized unit (c) are contained in an amount of the copolymer (I)/the copolymer (II)=10/90 to 95/5 (mass ratio), and $[a_1]-[a_2] \geq 10$ (mass %).

22 Claims, 2 Drawing Sheets

LIQUID REPELLENT COMPOSITION, LIQUID REPELLENT PROCESSING METHOD, AND ARTICLE HAVING LIQUID REPELLENT FILM

TECHNICAL FIELD

The present invention relates to a liquid repellent composition, a liquid repellent processing method, and an article having a liquid repelling film.

BACKGROUND ART

As a technique for imparting water and oil repellency to the surface at the same time, it has been common to treat an object with an organic solvent solution or an aqueous dispersion of a copolymer containing polymerized units of a polymerizable monomer containing a polyfluoroalkyl group (hereinafter, a polyfluoroalkyl group will be referred to as an $R^f$ group) in its molecule or a copolymer of such a polymerizable monomer with another monomer (hereinafter such a copolymer may be referred to also as an $R^f$ group-containing polymer).

The development of such water and oil repellency is attributed to formation of "a low energy surface" having a low critical surface tension on the surface of a coating film by surface orientation of $R^f$ groups. It has been considered that in order to develop both water repellency and oil repellency, the orientation of $R^f$ groups on the surface is important, and in order to realize the surface orientation of $R^f$ groups, it is important that the polymer has a melting point attributable to fine crystals derived from $R^f$ groups. For this purpose, an $R^f$ group-containing monomer which forms a homopolymer having a melting point attributable to fine crystals derived from $R^f$ groups (crystallizable $R^f$ group-containing monomer) has been used.

A composition having a copolymer containing polymerized units of such a crystallizable $R^f$ group-containing monomer (hereinafter, referred to also as a crystallizable polymer) as an effective component satisfies the object from the viewpoint of developing water and oil repellency, and improvements have been made in other practical functions. For example, durability against e.g. laundering, dry cleaning and abrasion has been improved by using a monomer which provides high hardness or a monomer having a crosslinkable reactive group in addition to the crystallizable $R^f$ group-containing monomer, or by blending the resulting copolymer with a polymer capable of forming strong coating films.

Further, investigations for softening the hard hand and lowering the melting point of $R^f$ groups in order to develop the water repellency under low-temperature curing conditions, have been made. For example, it is known to copolymerize a monomer containing a perfluoroalkyl group (hereinafter, a perfluoroalkyl group will be referred to as an $R^F$ group) having widely ranging chain lengths with an alkyl group-containing monomer.

Further, use of a silicone containing an $R^F$ group having widely ranging chain lengths is also known.

For example, a cosmetic composition containing a fluorine type compound and a wax having a specific melting point (for example, Patent Document 1), a quaternary copolymer comprising an $R^F$ group-containing (meth)acrylate, stearyl(meth)acrylate and other two types of monomers as essential components (for example, Patent Document 2), a mixture of a fluorine type water and oil repellent with an alcohol containing an $R^F$ group having a specific chain length or a perfluoropolyether group-containing alcohol (for example, Patent Document 3), and a reaction product of an amino group-containing silicone and an $R^f$ group-containing ester compound (for example, Patent Document 4) are known. Meanwhile, as an example using an $R^f$ group-containing monomer having a limited chain length, an acryl type heptanary copolymer having $R^F$ groups with a specified chain length distribution (for example, Patent Document 5) may be mentioned. It contains at least 40% of crystallizable $R^f$ group-containing monomers. The techniques in this field used in these known art references have improved physical properties from a viewpoint of functions required in addition to water and oil repellency, without impairing the water repellency and oil repellency attributable to $R^f$ groups. However, since an $R^f$ group-containing crystallizable polymer is used as the main component, the following demerits resulting therefrom have not been fundamentally overcome.

Patent Document 1: JP-A-7-173025
Patent Document 2: JP-A-10-237133
Patent Document 3: JP-A-10-81873
Patent Document 4: JP-A-8-109580
Patent Document 5: JP-A-62-179517

Problems to be Solved by the Invention

In conventional water and oil repellents (liquid repellents), in order to impart water and oil repellency, it has been considered essential to use a crystallizable $R^f$ group-containing monomer which has an $R^f$ group capable of forming fine crystals having a high melting point (usually at least 70° C.), among crystallizable $R^f$ group-containing monomers. However, if a crystallizable $R^f$ group-containing monomer is used, the entire polymer will have high crystallinity attributable thereto, and accordingly, an object coated or treated with such a polymer becomes very hard. For example, intrinsically soft fiber products may lose their soft hand, and since the coating film is hard and brittle, defects such as hand marks and chalk marks formed during handling the object tend to remain on fabrics as the finished products.

Further, a fiber product such as cloth or non-woven fabric treated with a water and oil repellent exhibits high water and oil repellency initially, but has had a drawback that its performance tends to substantially deteriorate by abrasion during the use or by repeated laundering. Namely, a water and oil repellent which can maintain the initial performance stably has been desired. Further, there are problems such as insufficient adhesion of the coating film on the surface and vulnerability to cracks and fractures which deteriorate the quality of the object, and therefore, it has been desired to overcome such problems.

Further, when a crystalline polymer containing $R^f$ groups is used as the main component, in order to obtain a uniform coating film having high water and oil repellency, usually, a post-application film formation step comprising melting the polymer at a temperature higher than the melting point of fine crystals and cooling has been essential. However, in the case of fiber products made of materials such as extrafine-denier fibers or modified cross-section fibers, such a high temperature treatment causes problems such as deterioration of color fastness, hard hand or fading, and therefore may lower the quality of treated objects.

Heretofore, in order to solve the problems with crystalline polymers containing $R^f$ groups, such techniques as lowering the crystallizability of the polymers and making the polymers flexible are known. Further, for the purpose of forming a film at a low temperature, such techniques as using a film coalescing aid and copolymerizing a polymerizable monomer containing a branched alkyl group and having an internal plasticization effect with a crystallizable $R^f$ group-containing monomer are known. However, in such a case, there are problems such as failure in development of water and oil repellency, insufficient coating film strength, inadequate adhesion to the substrate, and deterioration of the durability, because the crystals derived from $R^f$ groups for development of water and oil repellency are partially destroyed.

Further, there has been a problem that on a surface treated with a water and oil repellent having a crystalline polymer containing $R^f$ groups as an effective component, the adhesion and the hand are not satisfied at the same time. Namely, even when attempts to impart various functions to the surface of fiber products treated with a water and oil repellent containing a crystalline polymer, such as attachment of a film laminate or a seam tape for imparting waterproofness, and attachment of a coating of a urethane or acrylic resin for imparting moisture permeability and waterproofness, were made, it has been difficult to secure sufficient adhesion because the crystallizable $R^f$ groups impair the adhesion. Use of a copolymer of a crystallizable $R^f$ group-containing monomer and a specific monomer such as vinyl chloride may improve adhesion, but it tends to make the hand of fibers still harder, and thus, the adhesion and the hand have not been satisfied at the same time.

Further, in recent years, as a medium for water and oil repellents, it is required to use a medium which is friendly to the working and global environments, such as a water-based medium (hereinafter referred to as "aqueous medium"), an alcohol solvent, a petroleum solvent called a weak solvent or a fluorine solvent such as a hydrofluorocarbon having little influence on the ozone layer. However, conventional water and oil repellents having a crystalline polymer as an effective component are not friendly to the working and global environments, because they need to use a so-called strong solvent such as an aromatic solvent, a ketone or an ester, a chlorinated solvent or a fluorinated solvent such as a chlorofluorocarbon having a great influence on the ozone layer.

It is an object of the present invention to provide a liquid repellent composition capable of imparting excellent liquid repellency and durability to a substrate, and to provide an article having a liquid repellent film formed by means of such a liquid repellent composition.

Means to Accomplish the Object

The present invention provides a liquid repellent composition comprising a copolymer (I) and a copolymer (II), characterized in that the copolymer (I) contains from 65 to 95 mass % of a polymerized unit (a) and from 1 to 30 mass % of a polymerized unit (b) based on the mass of the copolymer (I); the copolymer (II) contains from 25 to 80 mass % of a polymerized unit (a) and from 1 to 50 mass % of a polymerized unit (c) based on the mass of the copolymer (II); when a mass ratio of the polymerized unit (a) in the copolymer (I) to the copolymer (I) is $[a_1]$ and a mass ratio of the polymerized unit (a) in the copolymer (II) to the copolymer (II) is $[a_2]$, $[a_1]-[a_2] \geq 10$ (mass %); and the copolymer (I) and the copolymer (II) are contained in an amount of [mass ratio of the copolymer (I)]/[mass ratio of the copolymer (II)]=10/90 to 95/5.

The polymerized unit (a) is a polymerized unit derived from a monomer represented by $(Z_A-Y_A)_n X_A$, provided that $Z_A$ is a polyfluoroalkyl group having at most 6 carbon atoms, n is 1 or 2, provided that when n is 2, two $(Z_A-Y_A)$ may be the same or different, $X_A$ is —CR=$CH_2$, —COOCR=$CH_2$, —OCOCR=$CH_2$, —OCH$_2$—ϕ—CR=$CH_2$ or —OCH=$CH_2$ when n is 1, and =CH(CH$_2$)$_m$CR=$CH_2$, =CH(CH$_2$)$_m$COOCR=$CH_2$, =CH(CH$_2$)$_m$OCOCR=$CH_2$ or —OCOCH=CHCOO— when n is 2, wherein R is a hydrogen atom, a methyl group or a halogen atom, ϕ is a phenylene group, and m is an integer of from 0 to 4, and $Y_A$ is a bivalent organic group or a single bond.

The polymerized unit (b) is a polymerized unit derived from a monomer represented by $Z_B-X_B$ provided that $Z_B$ is a hydrocarbon group having at least 14 carbon atoms, and $X_B$ is the same as $X_A$.

The polymerized unit (c) is a polymerized unit derived from a monomer having no polyfluoroalkyl group and having a cross-linkable functional group.

Further, in the liquid repellent composition of the present invention, the copolymer (I) and/or the copolymer (II) preferably contains a polymerized unit (d) derived from a monomer having a polymerizable group, other than the polymerized units (a), (b) and (c).

Further, the liquid repellent composition of the present invention preferably further contains a surfactant (III). The surfactant (III) comprises a surfactant (e1) and/or a surfactant (e2), and a surfactant (e3).

The surfactant (e1) is at least one surfactant selected from a polyoxyalkylene monoalkyl ether, a polyoxyalkylene monoalkenyl ether, a polyoxyalkylene monoalkapolyenyl ether and a polyoxyalkylene monopolyfluoroalkyl ether.

The surfactant (e2) is a nonionic surfactant made of a compound having at least one carbon-carbon triple bond and at least one hydroxyl group in its molecule.

The surfactant (e3) is a cationic surfactant represented by the following formula $s^{71}$ $$[(R^{21})_4 N^+] \cdot X^- \qquad \text{(formula } s^{71}\text{)},$$

wherein $R^{21}$ is a hydrogen atom, a $C_{1-22}$ alkyl group, a $C_{2-22}$ alkenyl group, a $C_{1-9}$ fluoroalkyl group or a POA chain having a hydroxyl group at a terminal, four $R^{21}$ may be the same or different, provided that four $R^{21}$ may not be hydrogen atoms at the same time, and $X^-$ is a counter ion.

Further, a liquid repellent processing method which comprises using the liquid repellent composition of the present invention and an article which has a liquid repellent film formed by means of the liquid repellent composition of the present invention are provided.

Effect of the Present Invention

According to the present invention, it is possible to provide a liquid repellent composition which is capable of imparting excellent liquid repellency and durability to an article. Further, by using the liquid repellent composition of the present invention, it is possible to provide an article having a liquid repellent film which is excellent in liquid repellency and durability.

BEST MODE FOR CARRYING OUT THE INVENTION

Figure 1:
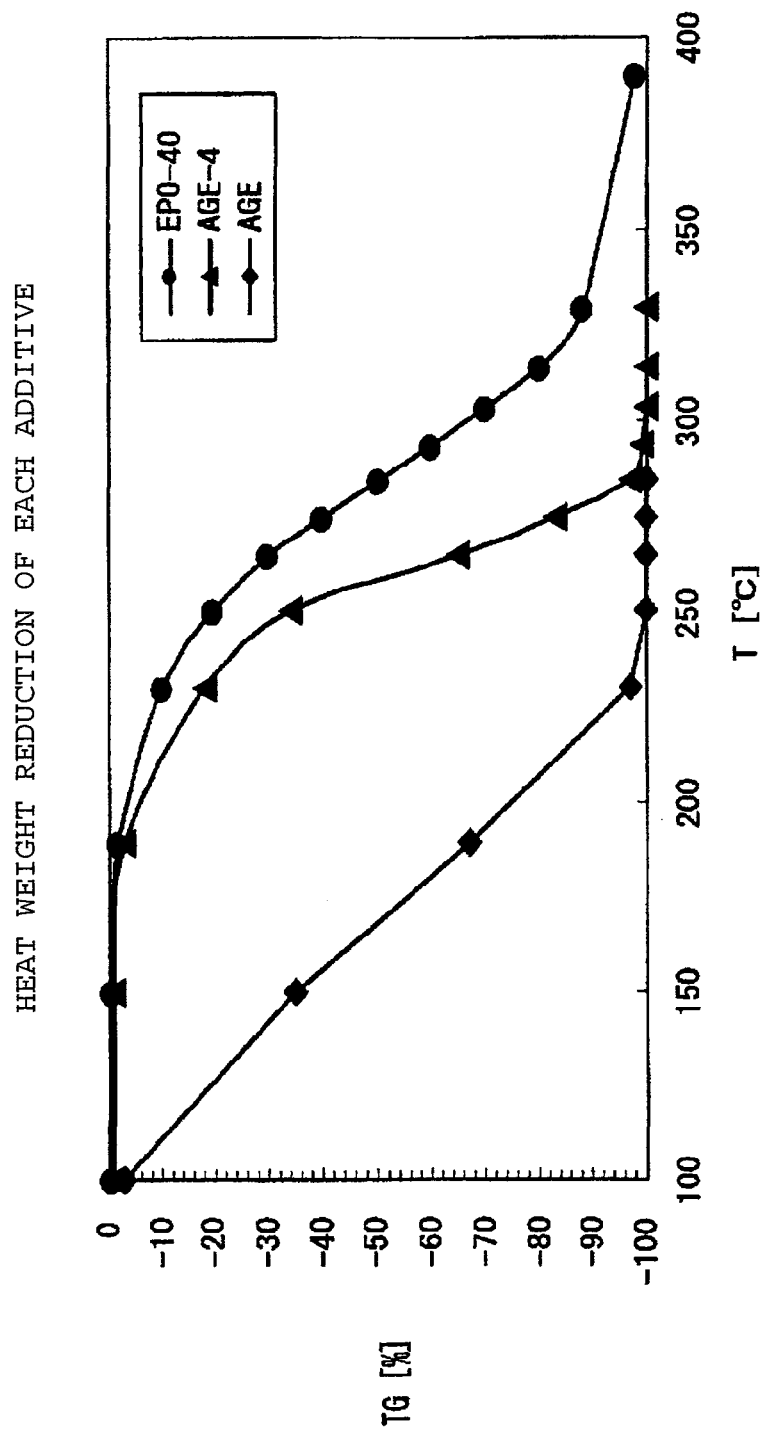
FIG. 1: Diagram which shows thermal weight reduction of respective additives (TG-DATA)
Figure 2:
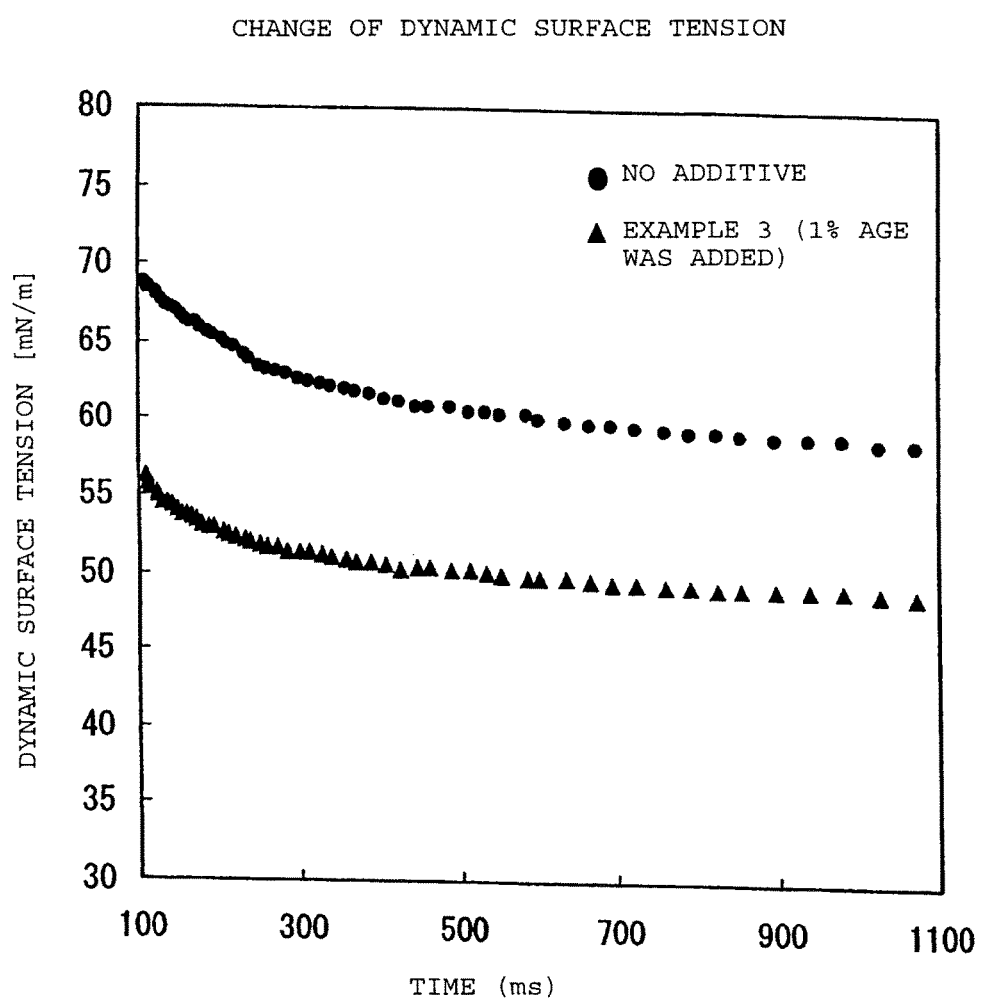
FIG. 2: Diagram which shows change in dynamic surface tension

The liquid repellent composition of the present invention comprises the copolymer (I) and the copolymer (II), and the copolymer (I) and the copolymer (II) can contain polymerized units (a) to (d), provided that the copolymer (I) contains the polymerized unit (a) and the polymerized unit (b), and the copolymer (II) contains the polymerized unit (a) and the polymerized unit (c). The copolymer (I) mainly contributes to development of liquid repellency of the liquid repellent composition, and the copolymer (II) mainly contributes to development of durability of the liquid repellent composition.

In the present invention, the polymerized unit (a) is a polymerized unit derived from a monomer having an $R^f$ group, represented by $(Z_A—Y_A)_n X_A$. Here, $Z_A$ is an $R^f$ group having at most 6 carbon atoms, and n is 1 or 2, provided that when n is 2, the two $(Z_A—Y_A)$ may be the same or different. When n is 1, $X_A$ is $—CR=CH_2$, $—COOCR=CH_2$, $—OCOCR=CH_2$, $—OCH_2—\phi—CR=CH_2$ or $—OCH=CH_2$, and when n is 2, X is $=CH(CH_2)_m CR=CH_2$, $=CH(CH_2)_m COOCR=CH_2$, $=CH(CH_2)_m OCOCR=CH_2$ or $—OCOCH=CHCOO—$ (wherein R is a hydrogen atom, a methyl group or a halogen atom, $\phi$ is a phenylene group, and m is an integer of from 0 to 4). Further, $Y_A$ is a bivalent organic group or a single bond.

The polymerized unit (a) of the present invention may be derived from a mixture of at least two monomers having the above $R^f$ group. The polymerized unit (a) mainly contributes to development of liquid repellency of the liquid repellent composition.

The $R^f$ group is a group having some or all of hydrogen atoms in an alkyl group substituted by fluorine atoms, and the carbon number is preferably from 1 to 6, provided that in a case where the $R^f$ group has an etheric oxygen atom, the carbon number may be from 1 to 20. The $R^f$ group is preferably a group wherein at least from 20 to 80% of hydrogen atoms in an alkyl group is substituted by fluorine atoms, whereas some or all of the rest of hydrogen atoms may be substituted by chlorine atoms. Further, such $R^f$ group may be linear or branched. In the case of a branched one, it is preferably one having a short branch at the terminal far from the bond or in the vicinity thereof. Further, among the above preferred $R^f$ groups, a linear $R^F$ group represented by $F(CF^2)_h—$ (wherein h is an integer of from 1 to 6) or a group represented by $C_2F_5(CM^1M^2CM^3M^4)_2$- (wherein each of $M^1$, $M^2$, $M^3$ and $M^4$ which are independent of one another, is a hydrogen atom, a fluorine atom or a chlorine atom, and one of them is a fluorine atom) is preferred. One having a small carbon number is preferred, since fine crystals attributable to $R^f$ groups tend to scarcely form when it is formed into a homopolymer, and since the copolymer can form a flexible coating film. The $R^f$ group may also be a linear polyfluorohydrocarbon having at least one unsaturated group such as carbon-carbon unsaturated double bond.

Specific $R^F$ groups may be the following $R^f$ groups, but not restricted thereto.

$F(CF_2)_4—$, $F(CF_2)_5—$, $F(CF_2)_6—$, $(CF_3)_2CF(CF_2)_2—$, $H(CF_2)_6—$, $HCF_2CF_2—$, $Cl(CF_2)_4—$, $F(CF_2)_4(CH_2CF_2)_3—$, $F(CF_2)_6(CH_2CF_2)_3—$, $F(CF_2)_4(CFClCF_2)_2—$, $CF_3CF=CFCF_2CF=CF—$.

Further, the $R^F$ group having an etheric oxygen atom may, for example, be $C_kF_{2k+1}O[CF(CF_3)CF_2O]_e—CF(CF_3)—$ and $C_3F_7O[CF(CF_3)CF_2O]_e(CF_2)_k—$ (k is an integer of from 3 to 6, and e is an integer of from 0 to 3).

The $R^f$ group and the polymerizable unsaturated group may be bonded by a single bond or via a bivalent organic group. As such a bivalent organic group, a group containing an alkylene group is preferred. As such an alkylene group, a linear or branched one may be employed. Further, such a bivalent organic group may contain $—O—$, $—NH—$, $—CO$, $—SO_2—$, $—CD^1=CD^2$- (wherein each of $D^1$ and $D^2$ which are independent of each other, is a hydrogen atom or a methyl group). As such a bivalent organic group, an alkylene group is preferred.

$Y_A$ is preferably a bivalent organic group represented by $—R^M-Q-R^N—$ (wherein each of $R^M$ and $R^N$ which are independent of each other, is a single bond or a $C_{1-22}$ saturated or unsaturated hydrocarbon group which may contain at least one oxygen atom, and Q is a single bond, $—OCONH—$, $—CONH—$, $—SO_2NH—$ or $—NHCONH—$). $Y_A$ may, for example, be preferably $—CH_2—$, $—CH_2CH_2—$, $—CH_2CH_2CH_2—$, $—(CH_2)_{11}—$, $—CH_2CH_2CH(CH_3)—$, $—CH=CHCH_2—$, $—(CH_2CHR^{20})_p CH_2CH_2—$ (wherein p is an integer of from 1 to 10, and $R^2$ is a hydrogen atom or a methyl group), $—C_2H_4OCONHC_2H_4—$, $—C_2H_4OCOOC_2H_4—$, or $—COOC_2H_4—$.

$X_A$ is preferably an ethylenic polymerizable unsaturated group such as an olefin residue, a vinyl ether residue, a vinyl ester residue, a (meth)acrylate residue, a maleate residue or a fumarate residue. Here, the olefin residue means a group represented by $—CR=CH_2$, the vinyl ester residue means a group represented by $—COOCR=CH_2$, the vinyl ether residue means a group represented by $—OCR=CH_2$, the (meth)acrylate residue means a group represented by $—OCOCR=CH_2$, and the maleate or fumarate residue means a group represented by $—OCOCH=CHCOO—$. In addition, $—OCH_2—\phi—CR=CH_2$ and $—OCH=CH_2$ may, for example, be mentioned (wherein $\phi$ is a phenylene group). Here, R is preferably a hydrogen atom, a halogen atom (such as a fluorine atom or a chlorine atom) or a $C_{1-3}$ short chain alkyl group (particularly a methyl group) in order not to hinder the polymerization. In consideration of the polymerizability for the copolymer, $X_A$ is preferably a (meth)acrylate residue, or a maleate or fumarate residue, and from the viewpoint of e.g. the solubility in the solvent or the efficiency of emulsion polymerization, a (meth)acrylate residue, especially a methacrylate residue, is particularly preferred.

The $R^f$ monomer is preferably a (meth)acrylate having an $R^f$ group, more preferably a methacrylate having an $R^f$ group. As such an $R^f$ monomer, various monomers including the following monomer (a) may be used. As such monomers, known monomers may be used. As the monomer to form the polymerized unit (a) to be used in the present invention, from the viewpoint of the polymerizability with other monomers, the flexibility of the coating film to be formed, the adhesion to a substrate, the solubility in a solvent, the efficiency of emulsion polymerization, etc., a (meth)acrylate is particularly preferred, and a methacrylate is especially preferred, as mentioned above.

In the case of a (meth)acrylate where the $R^f$ group is is an $R^F$ group, and $Y_A$ is $—(CH_2)—$, $—(CH_2CH_2)—$ or $—(CH_2)_3—$, if the $R^F$ group has at least 7 carbon atoms, the melting point attributable to fine crystals will be higher than 55° C. and the intended function will not be developed, and such a monomer is excluded from the monomer for the polymerized unit (a) to be employed in the present invention. In such a case, the $R^f$ group is preferably an $R^F$ group having at most 6 carbon atoms, most preferably a linear $R^F$ group having from 4 to 6 carbon atoms.

When $Y_A$ is $—CH_2CH_2CH(CH_3)—$ or $—CH=CH—CH_2—$ and $X_A$ is a (meth)acrylate, the $R^f$ group preferably has from 4 to 6 carbon atoms.

The polymerized unit (b) in the present invention is a polymerized unit derived from a monomer represented by $Z_B—X_B$. $Z_B$ is a hydrocarbon group having at least 14 carbons, may be a saturated hydrocarbon group or an unsaturated hydrocarbon group and may be linear or branched. For example, a tetradecyl group, a cetyl group, a heptadecyl group, a stearyl group, an icosyl group, a behenyl group, a lauroyl group, a tetracocyl group, a montanyl group and a stearoyl group may be mentioned. $X_B$ is preferably an ethylenic polymerizable unsaturated group such as an olefin residue, a vinyl ether residue, a vinyl ester residue, a (meth)acrylate residue, a maleate residue or a fumarate residue. The olefin residue means a group represented by —CR=CH$_2$, the vinyl ester residue means a group represented by —COOCR=CH$_2$, the vinyl ether residue means a group represented by —OCR=CH$_2$, the (meth)acrylate residue means a group represented by —OCOCR=CH$_2$, and the maleate or fumarate residue means a group represented by —OCOCH=CHCOO—. In addition, —OCH$_2$—φ—CR=CH$_2$ and —OCH=CH$_2$ may, for example, be mentioned (wherein φ is a phenylene group). Here, R is preferably a hydrogen atom, a halogen atom (such as a fluorine atom or a chlorine atom) or a $C_{1-3}$ short chain alkyl group (particularly a methyl group) in order not to hinder the polymerization. $X_B$ is more preferably a (meth)acrylate residue, a vinyl ether residue or a vinyl ester residue. As the monomer to form the polymerized unit (b), a mixture of at least two may also be used.

The monomer to form the polymerized unit (b) is preferably a monomer having a $C_{16-40}$ saturated hydrocarbon group, more preferably a (meth)acrylate having a $C_{16-40}$ alkyl group, further preferably a stearyl(meth)acrylate or a behenyl(meth)acrylate. A copolymer containing the polymerized unit (b) can impart water and oil repellency to fibers.

The polymerized unit (c) of the present invention is a unit derived from a monomer having no $R^f$ group and having a cross-likable functional group. The cross-linkable functional group is preferably a functional group which has at least one bond selected from a covalent bond, an ionic bond and a hydrogen bond, or which can form a cross-linked structure by interaction between these bonds. The functional group is preferably an isocyanate group, a blocked isocyanate group, an alkoxyl silyl group, an amino group, an alkoxymethylamide group, a silanol group, an ammonium group, an amide group, an epoxy group, a hydroxyl group, an oxazoline group, a carboxyl group, an alkenyl group, a sulfone group or the like. Further, the epoxy group, the hydroxyl group, the blocked isocyanate group, the alkoxyl silyl group, the amino group and the carboxyl group are more preferred.

The monomer to form the polymerized unit (c) is preferably a (meth)acrylate, a compound having at least two polymerizable groups, a vinyl ether or a vinyl ester. As the polymerized unit (c), a mixture of at least two may be used. As the monomer to form the polymerized unit (c), the following compounds are mentioned preferably.

2-Isocyanatoethyl(meth)acrylate, 3-isocyanatopropyl (meth)acrylate, 4-isocyanatobutyl(meth)acrylate, a 2-butanone oxime adduct of 2-isocyanatoethyl(meth)acrylate, a pyrazole adduct of 2-isocyanatoethyl(meth)acrylate, a 3,5-dimethylpyrazole adduct of 2-isocyanatoethyl (meth)acrylate, a 3-methylpyrazole adduct of 2-isocyanatoethyl(meth) acrylate, an ε-caprolactam adduct of 2-isocyanatoethyl (meth)acrylate, a 2-butanone oxime adduct of 3-isocyanatopropyl(meth)acrylate and a pyrazole adduct of 3-isocyanatopropyl(meth)acrylate.

A 3,5-dimethylpyrazole adduct of 3-isocyanatopropyl (meth)acrylate, a 3-methylpyrazole adduct of 3-isocyanatopropyl(meth)acrylate, an ε-caprolactam adduct of 3-isocyanatopropyl(meth)acrylate, a 2-butanone oxime adduct of 4-isocyanatobutyl(meth)acrylate, a pyrazole adduct of 4-isocyanatobutyl(meth)acrylate, a 3,5-dimethylpyrazole adduct of 4-isocyanatobutyl (meth)acrylate, a 3-methylpyrazole adduct of 4-isocyanatobutyl(meth)acrylate and an ε-caprolactam adduct of 4-isocyanatobutyl(meth)acrylate.

Methoxymethyl(meth)acrylamide, ethoxymethyl(meth) acrylamide, butoxymethyl(meth)acrylamide, diacetoneacrylamide, γ-methacryloyloxypropyltrimethoxysilane, trimethoxyvinylsilane, vinyltrimethoxysilane, dimethylaminoethyl(meth)acrylate, diethylaminoethyl (meth)acrylate, dimethylaminopropyl(meth)acrylate, (meth)acryloylmorpholine, (meth)acryloyloxyethyltrimethylammonium chloride, (meth)acryloyloxypropyltrimethylammonium chloride, (meth)acrylamidoethyltrimethylammonium chloride and (meth)acrylamidopropyltrimethylammonium chloride.

t-Butyl(meth)acrylamidosulfonic acid, (meth)acrylamide, N-methyl(meth)acrylamide, N-methylol(meth)acrylamide, diacetone(meth)acrylamide, glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono(meth)acrylate, (meth)acrylic acid, 2-(meth)acryloyloxyethylsuccinic acid, 2-(meth)acryloyloxyhexahydrophthalic acid, 2-(meth)acryloyloxyethyl acid phosphate, allyl (meth)acrylate, 2-vinyl-2-oxazoline, 2-vinyl-4-methyl-(2-vinyloxazoline) and a polycaprolactone ester of hydroxyethyl (meth)acrylate.

Tri(meth)allyl isocyanurate (T(M)AIC), triallyl isocyanurate (TAC), phenyl glycidyl ethylacrylate tolylene diisocyanate (AT-600), 3-(methyl ethyl ketone oxime)isocyanatomethyl-3,5,5-trimethylcyclohexyl(2-hydroxyethyl methacrylate cyanate (HE-6P).

As the monomer (c), N-methylol (meth)acrylamide, 2-hydroxyethyl(meth)acrylate, a 3,5-dimethylpyrazole adduct of 3-isocyanatopropyl(meth)acrylate, diacetone acrylamide, glycidyl methacrylate, or a polycaprolactone ester of hydroxyethyl(meth)acrylate, AT-600 (manufactured by Kyoeisha Chemical Co., Ltd.) or Tech coat HE-6P (manufactured by KYOKENKASEI Co., Ltd.) is particularly preferred.

The polymerized unit (c) mainly affects a film-forming property of a liquid repellent film and adhesion and adherence property between a liquid repellent composition and a substrate and contributes to improve durability.

The polymerized unit (d) of the present invention is a polymerized unit derived from a monomer having a polymerizable group, other than the polymerized units (a), (b) and (c). Further, the polymerized unit (d) is preferably one derived from a monomer, whereby a uniform copolymerization solution or dispersion which is excellent in a film-forming property can be obtained.

As the monomer to form the polymerized unit (d), the following compounds may, for example, be mentioned.

Methyl acrylate, ethyl acrylate, propyl acrylate, butyl methacrylate, cyclohexyl acrylate, 2-ethyl hexyl (meth)acrylate, butyl methacrylate, n-hexyl (meth)acrylate, cyclohexyl acrylate, vinyl acetate, vinyl propionate, vinylidene chloride, butene, isoprene, butadiene, ethylene, propylene, vinyl ethylene, pentene, ethyl-2-propylene, butyl ethylene, cyclohexyl propyl ethylene, decyl ethylene, dodecylethylene, hexane, isohexyl ethylene, neopentyl ethylene, 1,2-diethoxy carbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methyl styrene, p-methyl styrene, hexyl styrene, octyl styrene, nonyl styrene, chloroprene, vinyl chloride and vinylidene fluoride.

N,N-dimethyl (meth)acrylamide, vinyl alkyl ether, alkyl vinyl ether halide, vinyl alkyl ketone, butyl acrylate, propyl methacrylate, cyclohexyl methacrylate, benzyl (meth)acrylate, octyl (meth)acrylate, decyl methacrylate, dodecyl acrylate, cyclododecyl acrylate, lauryl (meth)acrylate, 3-ethoxypropyl acrylate, methoxybutylacrylate, 2-ethyl butyl acrylate, 1,3-dimethyl butyl acrylate, 2-methyl pentyl acrylate, aziridinyl ethyl (meth)acrylate, 2-ethyl hexyl polyoxyalkylene (meth)acrylate and polyoxyalkylene di(meth)acrylate.

A crotonic acid alkyl ester, a maleic acid alkyl ester, a fumaric acid alkyl ester, a citraconic acid alkyl ester, a mesaconic acid alkyl ester, allyl acetate, N-vinylcarbazole, maleimide, N-methylmaleimide, a (meth)acrylate having a silicone at a side chain, a (meth)acrylate having a urethane bond, a (meth)acrylate having a $C_{1-4}$ polyoxyalkylene chain at a terminal, etc.

The polymerized unit (d) is preferably derived from vinyl chloride, vinylidene chloride, cyclohexylmethacrylate, polyoxyethylene di(meth)acrylate, an alkyl ether of polyoxyethylene di(meth)acrylate or dioctyl malate. The polymerized unit (d) contributes to improvement of an adherence property between the composition and a substrate and dispersibility.

The copolymer (I) and the copolymer (II) of the liquid repellent composition of the present invention can contain the above explained polymerized units (a) to (d).

The copolymer (I) of the liquid repellent composition of the present invention contains from 65 to 95 mass % of the polymerized unit (a), based on the mass of the copolymer (I). The content of the polymerized unit (a) in the polymer (I) is preferably from 70 to 95 mass %, more preferably from 70 to 90 mass %. If the polymerized unit (a) is contained in the polymer (I) within the above range, the liquid repellency can be sufficiently developed.

The copolymer (II) contains from 25 to 80 mass % of the polymerized unit (a), based on the mass of the copolymer (II). The content of the polymerized unit (a) in the polymer (II) is preferably from 30 to 80 mass %, more preferably from 30 to 75 mass %. If the polymerized unit (a) is contained in the polymer (II) within the above range, the liquid repellency can be maintained high.

Further, when a mass ratio of the polymerized unit (a) in the copolymer (I) to the copolymer (I) is $[a_1]$, and a mass ratio of the polymerized unit (a) in the copolymer (II) to the copolymer (II) is $[a_2]$, $[a_1]-[a_2] \geq 10$ (mass %). The above relation is preferably $[a_1]-[a_2] \geq 30$.

Further, the copolymer (I) contains from 1 to 30 mass % of the polymerized unit (b). The polymerized unit (b) in the copolymer (I) is preferably from 1 to 27 mass %, more preferably from 3 to 27 mass %. If the polymerized unit (b) is contained in the polymer (I) within the above range, the liquid repellency can be sufficiently developed.

Further, the copolymer (II) contains from 1 to 50 mass % of the polymerized unit (c). The polymerized unit (c) in the copolymer (II) is preferably from 1 to 40 mass %, more preferably from 1 to 35 mass %. If the polymerized unit (c) is contained in the polymer (II) within the above range, the durability can be sufficiently developed.

In the liquid repellent composition of the present invention, the copolymer (I) and the copolymer (II) are contained in a ratio of [mass ratio of the copolymer (I)]/[mass ratio of the copolymer (II)]=10/90 to 95/5.

In the liquid repellent composition of the present invention, the form of the copolymer (I) and the copolymer (II) may be a form wherein separate particles of the copolymer (I) and the copolymer (II) are randomly mixed, or the copolymer (I) and the copolymer (II) exist in the same particle (for example, a core-shell type).

In a case where the copolymer (I) particles and the copolymer (II) particles of the present invention exist in the liquid repellent composition as a random mixture, the copolymer (I) and the copolymer (II) are mixed in a ratio of [mass ratio of the copolymer (I)]/[mass ratio of the copolymer (II)]=10/90 to 95/5. Further, it is preferably [mass ratio of the copolymer (I)]/[mass ratio of the copolymer (II)]=20/80 to 90/10. If the copolymer (I) and the polymer (II) are contained with the above ratio, the function of the liquid repellency of the copolymer (I) and the function of the adhesion adherence property of the copolymer (II) can be developed synergistically.

Here, in a case where the polymerized units (a), (b), (c) and (d) are contained as a whole, the polymerized unit (a) is preferably contained in amount of from 20 to 95 mass %, more preferably from 30 to 90 mass % in the total copolymers. The polymerized unit (b) is preferably contained in amount of from 0.1 to 80 mass %, more preferably from 0.5 to 70 mass % in the total copolymers. The polymerized unit (c) is preferably contained in amount of from 0.1 to 20 mass %, more preferably from 0.5 to 15 mass % in the total copolymers. The polymerized unit (d) is preferably contained in amount of from 0.1 to 30 mass %, more preferably from 1 to 20 mass % in the total copolymers. If the composition is within the above ranges, a liquid repellent composition to be obtained has better liquid repellency and durability.

In the form wherein the copolymer (I) and the copolymer (II) exist in the same particle, the form of the copolymer (II) varies, depending on the amount of a surfactant which coexists in a fine particle dispersion of the copolymer (I) or the degree of hydrophobicity of monomers constituting the copolymer (I) and the copolymer (II) or the distribution coefficient of monomers constituting the copolymer (II) to a water phase. However, preferred are copolymer particles in the form wherein the copolymer (II) exists on a surface or in inside of fine particles of the copolymer (I). In the copolymer particles, the core-shell type wherein the copolymer (I) is and the copolymer (II) are separated in a layer state is preferred from the viewpoint of the properties, and the layer separation state may be a sea-island structure, one wherein a part of the copolymer is localized or a state wherein another copolymer molecule chain or the like is twined. It is considered that in such a state, it is possible to obtain excellent water and oil repellency (liquid repellency) which cannot be obtained by separately producing a dispersion of the copolymer (I) and a dispersion of the copolymer (II) and mixing them.

In the case of the core-shell type wherein the copolymer (I) and the copolymer (II) are separated in a layer state, it is preferred that the copolymer (I) is a core part, and the copolymer (II) is a shell part. In such a case, the adhesion adherence property of the copolymer (II) can be improved, the durability can be improved, and the effective sea-island structure can be formed on a coating film, whereby high liquid repellency can be obtained.

If the copolymer (I) of the present invention contains the polymerized unit (a) and the polymerized unit (b), the copolymer (I) may contain the polymerized unit (c) and the polymerized unit (d). Further, if the copolymer (II) of the present invention contains the polymerized unit (a) and the polymerized unit (c), the copolymer (II) may contain the polymerized unit (b) and the polymerized unit (d). In a case where the copolymer (I) and the copolymer (II) of the present invention are in the form of the core-shell type, it is preferred that both the copolymer (I) and the copolymer (II) contain the polymerized unit (d).

The combination of the polymerized units of the copolymer (I) and the copolymer (II) in the form of the core-shell type may, for example, be a combination of the copolymer (I) containing the polymerized units (a) and (b) and the copolymer (II) containing the polymerized units (a) and (c), a combination of the copolymer (I) containing the polymerized units (a) and (b) and the copolymer (II) containing the polymerized units (a), (c) and (d), a combination of the copolymer (I) containing the polymerized units (a), (b) and (c) and the copolymer (II) containing the polymerized units (a), (c) and (b), a combination of the copolymer (I) containing the polymerized units (a), (b) and (d) and the copolymer (II) containing the polymerized units (a), (c) and (d) or a combination of the copolymer (I) containing the polymerized units (a), (b), (c) and (d) and the copolymer (II) containing the polymerized units (a), (c) and (d).

In a case where the copolymer (I) contains the polymerized units (a), (b), (c) and (d), the ratio of the respective polymerized units in the polymer (I) is preferably (a):(b):(c):(d)=65 to 95:1 to 30:0.1 to 20:0.1 to 20 (mass %). Further, in a case where the copolymer (I) contains the polymerized units (a), (b) and (d), the ratio of the respective polymerized units in the polymer (I) is preferably (a):(b):(d)=65 to 95:1 to 30:0.1 to 20 (mass %). In a case where the copolymer (II) contains the polymerized units (a), (c) and (d), the ratio of the respective polymerized units in the polymer (II) is preferably (a):(c):(d)=25 to 80:1 to 50:10 to 55 (mass %).

In a case where the copolymer (I) and the copolymer (II) of the present invention exist in the same particle, and the polymerized units (a), (b), (c) and (d) are contained in the particle, the amount of the polymerized unit (a) is preferably from 55 to 95 mass % in the total polymers, more preferably from 60 to 90 mass %. The amount of the polymerized unit (b) is preferably from 0.1 to 30 mass % in the total polymers, more preferably from 0.5 to 15 mass %. The amount of the polymerized unit (c) is preferably from 0.1 to 20 mass % in the total polymers, more preferably from 0.5 to 10 mass %. The amount of the polymerized unit (d) is preferably from 0.1 to 30 mass % in the total polymers, more preferably from 1 to 20 mass %. If the composition is within the above ranges, a liquid repellent composition to be obtained is excellent in the liquid repellency and durability.

In the case of the core shell type of the copolymer (I) and the copolymer (II), it is preferred that [mass ratio of the copolymer (I)]/[mass ratio of the copolymer (II)]=60/40 to 90/10. Further, as a case requires, an additional copolymer may be contained. For example, the core shell type particles of the copolymer (I) and the copolymer (II) may be mixed with another copolymer (II)' and used.

Further, in the case of the core-shell type of the copolymer (I) and the copolymer (II), particularly, an amount of the polymerized unit (a) is preferably from 55 to 95 mass %, more preferably from 60 to 90 mass % in the total copolymers. The amount of the polymerized unit (b) is preferably from 0.1 to 30 mass %, more preferably from 0.5 to 15 mass % in the total copolymers. The amount of the polymerized unit (c) is preferably from 0.1 to 20 mass %, more preferably from 0.5 to 10 mass % in the total copolymers. The amount of the polymerized unit (d) is preferably from 0.1 to 30 mass %, more preferably from 1 to 20 mass % in the total copolymers. Within the above ranges, a liquid repellent composition to be obtained is excellent in the liquid repellency and durability.

In the liquid repellent composition of the present invention, a preparation method of effective components of the copolymer (I) and the copolymer (II) is not particularly limited. For example, conventional polymerization methods such as a dispersion polymerization method, an emulsion polymerization method and a suspension polymerization method employing water as a dispersant and a nonionic surfactant and/or a cationic surfactant, a nonionic surfactant and/or an ampholytic surfactant or a nonionic surfactant and/or an anionic surfactant, may be used. Particularly, a copolymer is preferably produced in a medium containing water by emulsion polymerization. An obtained solution, dispersion or emulsion of a copolymer may be used as it is or diluted for use. Further, after the copolymer is separated, it may be solved, dispersed or emulsified in a solvent, a dispersion medium or an emulsion medium.

It is preferred to carry out pre-emulsification by means of a high pressure emulsion machine before polymerization reaction starts. For example, a mixture of a monomer, a surfactant and a water medium is preferably mixed and dispersed by a homo mixer, a high pressure emulsion machine or the like. If a polymerization mixture is preliminarily mixed and dispersed before polymerization reaction starts, yield of a copolymer to be finally obtained is improved.

In a case where the copolymer (I) and the copolymer (II) separately exist, it is preferably prepared by polymerizing the copolymer (I) and the copolymer (II) separately, preparing respective dispersions of the copolymers (I) and the copolymer (II), followed by mixing the dispersions.

In a case where the copolymers (I) and the copolymer (II) exist in the same particle, polymerizable monomers may be reacted at once, or monomers which constitute the copolymer (II) may be polymerized in the presence of the copolymer (I). The latter method is not particularly limited, however, a method wherein monomers which constitute the copolymer (II) is added at once or by dividing into a few portions, to a emulsion or dispersion in which the copolymer (I) exist in the form of fine particles, and then a polymerization initiator is added to initiate polymerization (so-called seed emulsion polymerization method) is preferred.

It is preferred to thoroughly stir the mixture containing monomers to constitute the copolymer (I) and the copolymer (II), before polymerization of the monomer to constitute the copolymer (II) starts, whereby the final yield can be improved.

The amount of the monomer to constitute the copolymer (II) to the copolymer (I) is [mass ratio of the copolymer (I)]/[mass ratio of the copolymer (II)]=10/90 to 95/5, preferably 20/80 to 90/10.

In the liquid repellent composition of the present invention, it is preferred that the copolymers (I) and the copolymer (II) are dispersed in the form of particles in a medium. The number average particle diameter of copolymers dispersed in a medium is preferably from 10 to 1000 nm, particularly preferably from 10 to 300 nm, especially preferably from 10 to 200 nm. If the average particle diameter is within the above range, it is not necessary to use a large amount of a surfactant, a dispersant, etc., water and oil repellency is excellent, decolorization can be prevented in a case where a dyed cloth is treated with the composition, and the dispersion particles can stably exist in a medium without sedimentation. In the present invention, the average particle diameter is measured by a dynamic light scattering apparatus, a microscope, etc.

For the liquid repellent composition of the present invention, a medium is preferably used. The medium is preferably water, an alcohol, a glycol, a glycol ether, a halide, a hydrocarbon, a ketone, an ester, an ether, a nitride, a sulfide, an inorganic solvent, an organic solvent, and at least one medium selected from the group consisting of water, an alcohol, a glycol, a glycol ether and a glycol ester is particularly preferred from the viewpoint of solubility and handling efficiency. Specific examples of the preferable medium will be mentioned below.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol or 3-heptanol.

The glycol or the glycol ether may, for example be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, and the glycol ether may, for example, be propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monomethyl ether, tripropylene glycol, tripropylene glycol monomethyl ether, polypropylene glycol or hexylene glycol.

The halide is preferably a hydrocarbon halide or an ether halide. The hydrocarbon halide may, for example, be a hydrochlorofluorocarbon, a hydrofluorocarbon or a hydrobromocarbon.

The hydrochlorofluorocarbon may preferably be e.g. $CH_3CCl_2F$, $CHCl_2CF_2CF_3$ or $CHClFCF_2CClF$.

The hydrofluorocarbon may preferably be e.g. $CF_3CF_2CF_2CHF_2$, $CF_3CF_2CF_2CH_2F$, $CF_3CF_2CH_2CF_3$, $CHF_2CF_2CF_2CHF_2$, $CHF_2CH_2CF_2CF_3$, $CF_3CHFCH_2CF_3$, $CF_3CH_2CF_2CHF_2$, $CHF_2CHFCF_2CHF_2$, $CF_3CHFCF_2CH_3$, $CHF_2CHFCHFCHF_2$, $CF_3CH_2CF_2CH_3$, $CF_3CF_2CH_2CH_3$, $CHF_2CH_2CF_2CH_3$, $CHF_2CF_2CF_2CF_3$, $CF_3CF_2CF_2CHFCF_3$, $CHF_2CF_2CF_2CF_2CHF_2$, $CF_3CHFCHFCF_2CF_3$, $CF_3CHFCF_2CH_2CF_3$, $CF_3CF(CF_3)CH_2CHF_2$, $CF_3CH(CF_3)CH_2CF_3$, $CF_3CH_2CF_2CH_2CF_3$, $CHF_2CHFCF_2CHFCHF_2$, $CHF_2CF_2CF_2CHFCH_3$, $CF_3CH_2CH_2CH_2CF_3$, $CHF_2CH_2CF_2CH_2CF_2$, $CF_3(CF_2)_4CHF_2$, $CF_3(CF_2)_4CH_2F$, $CF_3CF_2CF_2CF_2CH_2CF_3$, $CHF_2CF_2CF_2CF_2CF_2CHF_2$, $CF_3CH(CF_3)_4CHFCF_2CF_3$, $CF_3CF_2CH_2CH(CF_3)CF_3$, $CF_3CH_2CF_2CF_2CH_2CF_3$, $CF_3CF_2CH_2CH_2CF_2CF_3$, $CF_3CF_2CF_2CF_2CH_2CH_3$, $CF_3CH(CF_3)CH_2CH_2CF_3$, $CHF_2CF_2CH_2CH_2CF_2CHF_2$ or $CF_3CF_2CF_2CH_2CH_2CH_3$.

The hydrobromocarbon e.g. $CH_2Br_2$, $CH_2BrCH_2CH_3$, $CH_3CHBrCH_3$ or $CH_2BrCHBrCH_3$.

The ether halide may, for example, be a hydrofluoroether. The hydrofluoroether may, for example, be a separate type hydrofluoroether or a non-separate type hydrofluoroether. The separate type hydrofluoroether is a compound wherein a perfluoroalkyl group or a perfluoroalkylene group and an alkyl group or an alkylene group are bonded via an etheric oxygen atom. The non-separate type hydrofluoroether is a hydrofluoroether containing a partially fluorinated alkyl or alkylene group.

The separate type hydrofluoroether may preferably be e.g. $CF_3CF_2CF_2OCH_3$, $(CF_3)_2CFOCH_3$, $CF_3CF_2CF_2OCH_2CH_3$, $CF_3CF_2CF_2CF_2OCH_3$, $(CF_3)_2CFCF_2OCH_3$, $(CF_3)_3COCH_3$, $CF_3CF_2CF_2CF_2OCH_2CH_3$, $(CF_3)_2CFCF_2OCH_2CH_3$, $(CF_3)_3COCH_2CH_3$, $CF_3CF(OCH_3)CF(CF_3)_2$, $CF_3CF(OCH_2CH_3)CF(CF_3)_2$, $C_5F_{11}OCH_2CH_3$, $CF_3CF_2CF_2CF(OCH_2CH_3)CF(CF_3)_2$, $CH_3O(CF_2)_4OCH_3$, $CH_3OCF_2CF_2OCH_2CH_3$ or $C_3H_7OCF(CF_3)CF_2OCH_3$.

The non-separate type hydrofluoroether may preferably be e.g. $CHF_2OCF_2OCHF_2$, $CH_2FCF_2OCHF_2$, $CF_3CF_2CF_2OCH_2F$, $CF_3CF_2OCH_2CHF_2$, $CHF_2CF_2CH_2OCF_3$, $CF_3CF_2CH_2OCHF_2$, $CHF_2CF_2OCH_2CHF_2$, $CF_3CH_2OCF_2CH_2F$, $CF_3CH_2OCF_2CHF_2$, $CHF_2CF_2CF_2OCH_3$, $HF_2CF_2CH_2OCH_3$, $CF_3CF_2CF_2OCH_2CF_3$, $CF_3CF_2CH_2OCF_2CF_3$, $CF_3CF_2CF_2OCH_2CHF_2$, $CF_3CF_2CH_2OCF_2CHF_2$, $CHF_2CF_2CH_2OCF_2CF_3$, $CHF_2CF_2CH_2OCF_2CHF_2$, $CF_3CHFCF_2CH_2OCF_3$, $CF_3CHFCF_2CH_2OCHF_2$, $CF_3CF_2CF_2CH_2OCH_3$, $(CF_3)_2CHCF_2OCH_3$, $CF_3CF_2CF_2OCH_2CF_3$, $CF_3CF_2CF_2OCH_2CF_2CHF_2$, $CF_3CF_2CF_2CF_2OCF_2CHF_2$, $CF_3(CF_2)_5OCHF_2$, $CHF_2OCF_2CF_2OCHF_2$, $CHF_2OCF_2OCF_2CF_2OCHF_2$ or $CHF_2OCF_2OCF_2OCF_2OCHF_2$.

The hydrocarbon may, for example, be an aliphatic hydrocarbon, an alicyclic hydrocarbon or an aromatic hydrocarbon. As the aliphatic hydrocarbon, e.g. pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane, may preferably be mentioned.

As the alicyclic hydrocarbon, e.g. cyclopentane, methylcyclopentane, cyclohexane, methylcyclohexane or ethylcyclohexane, may preferably be mentioned. As the aromatic hydrocarbon, e.g. benzene, toluene or xylene, may preferably be mentioned.

As the ketone, e.g. acetone, methyl ethyl ketone, 2-pentanone, 3-pentanone, 2-hexanone or methyl isobutyl ketone, may preferably be mentioned.

As the ester, e.g. methyl acetate, ethyl acetate, butyl acetate, methyl propionate, methyl lactate, ethyl lactate or pentyl lactate, may preferably be mentioned.

As the ether, e.g. diisopropyl ether, dioxane or tetrahydrofuran, may preferably be mentioned.

As the nitride, e.g. pyridine, N,N-dimethylformamide, N,N-dimethylacetamide or N-methylpyrrolidone, may preferably be mentioned.

As the sulfide, e.g. dimethylsulfoxide or sulfolane, may preferably be mentioned.

As the inorganic solvent, liquid carbon dioxide may preferably be mentioned.

As the organic solvent, e.g. acetic acid, propionic acid, malic acid, lactic acid, may preferably be mentioned.

In the present invention, a mixture of two or more mediums may be used, and in a case two or more mediums are mixed, they are preferably mixed with water for use. By using a mixed medium, solubility and dispersibility of copolymers can be easily controlled, and at a time of processing, permeability to a substrate, wettability, rate of drying a solvent, etc., can easily be controlled.

The liquid repellent composition of the present invention preferably contains a surfactant (III) to improve dispersibility of copolymers in a medium. In the present invention, even if an amount of a surfactant is low (for example, at most 4 parts), a stable emulsion can be obtained, and by reducing an amount of a surfactant, hydrophilic influence can be removed, and properties can be improved.

As the surfactant (III), a hydrocarbon type or a fluorine type surfactant may be used, and an anionic, nonionic, cationic or amphiprotic surfactant may be used. From the viewpoint of stable dispersibility, a nonionic surfactant is preferably used in combination with a cationic or an amphiprotic surfactant, or an anionic surfactant is solely used. Particularly, a combination of a nonionic surfactant and a cationic surfactant is preferred, and they are preferably used in a mass ratio of 97/3 to 40/60. In the case of the combination of a nonionic surfactant and a cationic surfactant, the total amount of the surfactants to be used can be reduced at a level of at most 5 mass %, whereby hydrophilic property becomes low, and an excellent liquid repellency can be imparted to a substrate.

The nonionic surfactant is preferably at least one nonionic surfactant selected from the group consisting of the following surfactants $s^1$ to $s^6$.

Surfactant $s^1$: a polyoxyalkylenemonoalkyl ether, a polyoxyalkenylenemonoalkenyl ether, a polyoxyalkylenemonoalkapolyenyl ether or a polyoxyalkylenemonopolyfluoroalkyl ether.

Surfactant $s^2$: a nonionic surfactant made of a compound having at least one carbon-carbon triple bond and at least one hydroxyl group in its molecule.

Surfactant $s^3$: a nonionic surfactant made of a compound wherein a POE chain having at least two oxyethylenes tandemly connected and chains having at least two oxyalkylenes having at least three carbon atoms tandemly connected, and having hydroxyl groups on both terminals.

Surfactant $s^4$: a nonionic surfactant having an amine oxide moiety in its molecule.

Surfactant $s^5$: a nonionic surfactant made of a condensate of a polyoxyethylene mono(substituted phenyl)ether or a polyoxyethylene mono(substituted phenyl)ether.

Surfactant $s^6$: a nonionic surfactant made of a fatty acid ester of polyol.

The alkyl group, alkenyl group, alkapolyenyl group or polyfluoroalkyl group in the surfactant $s^1$ (hereinafter referred to as $R^s$ group) preferably has from 4 to 26 carbons. The $R^s$ group may be linear or branched. The branch structure is preferably a sec-alkyl group, a sec-alkenyl group or a sec-alkapolyenyl group. Further, a part of or all hydrogen atoms may be substituted with fluorine atoms.

As specific examples of the $R^s$ group, an octyl group, a dodecyl group, a tetra decyl group, a hexadecyl group, an octadecyl group, a hexadecyl group, a behenyl group (docosyl group), an oleyl group (9-octadecenyl group), a heptadecylfluorooctyl group, a tridecyl fluorohexyl group, a 1H,1H,2H,2H-tridecylfluorooctyl group, a 1H,1H,2H-nonafluorohexyl group, etc., may be mentioned.

The surfactant $s^1$ is preferably a polyoxyalkylenemonoalkyl ether, a polyoxyalkylenemonoalkenyl ether or a polyoxyalkylenemonopolyfluoroalkyl ether. $R^1$ may be used alone, or two or more $R^1$ may be used in combination.

The polyoxyalkylene (hereinafter referred to as POA) chain in the surfactant $s^1$ is preferably a chain wherein at least two polyoxyethylene (hereinafter referred to as POE) chains and/or polyoxypropylene (hereinafter referred to as POP) chains are connected. As the POA chain, only one type of the POA chain may be used, or two or more types of the POA chains may be used in combination. In the case of the two types of the POA chains, the structure is preferably a block form.

The surfactant $s^1$ is preferably a compound represented by the following formula $S^{11}$.

$$R^{10}O[CH_2CH(CH_3)O]_q\text{—}(CH_2CH_2O)_rH \quad \text{Formula } S^{11}$$

Here, $R^{10}$ is an alkyl group having at least eight carbons or an alkenyl group having at least eight carbons, q is 0 or an integer of from 1 to 20, and r is an integer of from 5 to 50. In a case where q and r are at least 2, a POE chain and a POP chain in the formula $S^{11}$ are connected in a block form. $R^{10}$ is preferably linear or branched, q is preferably 0 or an integer of from 1 to 10, and r is preferably an integer of from 10 to 30. In a case where r is at most 4, or q is at least 21, the surfactant $s^1$ is insoluble in water and does not solve in a water type medium uniformly, whereby an immerse effect of a liquid repellent composition to objects to be treated is low. In a case where r is at least 51, hydrophilic property is strong, whereby a liquid repellency deteriorates.

As specific examples of the compound represented by the formula $s^{11}$, the following compounds may be mentioned, provided that a POE chain and a POP chain are connected in the form of block.

$C_{18}H_{37}O[CH_2CH(CH_3)O]_2\text{—}(CH_2CH_2O)_{30}H$, $C_{18}H_{35}O[CH_2CH(CH_3)O]_0\text{—}(CH_2CH_2O)_{30}H$, $C_{16}H_{33}O[CH_2CH(CH_3)O]_5\text{—}(CH_2CH_2O)_{20}H$, $C_{12}H_{25}O[CH_2CH(CH_3)O]_2\text{—}(CH_2CH_2O)_{15}H$, $(C_8H_{17})(C_6H_{13})CHO[CH_2CH(CH_3)O]_0\text{—}(CH_2CH_2O)_{15}H$, $C_{10}H_{21}O[CH_2CH(CH_3)O]_2\text{—}(CH_2CH_2O)_{15}H$, $C_6C_{13}CH_2CH_2[CH_2CH(CH_3)O]_0\text{—}(CH_2CH_2O)_{15}H$, $C_6F_{13}CH_2CH_2[CH_2CH(CH_3)O]_2\text{—}(CH_2CH_2O)_{15}H$, $C_4F_9CH_2CH_2[CH_2CH(CH_3)O]_2\text{—}(CH_2CH_2O)_{15}H$.

The surfactant $s^2$ is preferably a nonionic surfactant which is a compound having at least one carbon-carbon triple bond and one or two hydroxyl groups in its molecule. The surfactant $s^2$ may have a POA chain in its molecule. The POA chain may, for example, be a POE chain, a POP chain, a chain wherein a POE chain and a POP chain are randomly connected or a chain wherein a POE chain and a POP chain are connected in the form of block.

As specific examples of the surfactant $s^2$, compounds represented by the following formulae $s^{21}$, $s^{22}$, $s^{23}$ or $s^{24}$ are preferred.

$$HO\text{—}CR^{11}R^{12}\text{—}C\equiv C\text{—}CR^{13}R^{14}\text{—}OH \quad \text{Formula } s^{21}$$

$$HO\text{-}(A^1O)_u\text{—}CR^{11}R^{12}\text{—}C\equiv C\text{—}CR^{13}R^{14}\text{—}(OA^2)_v\text{-}OH \quad \text{Formula } s^{22}$$

$$HO\text{—}CR^{15}R^{16}\text{—}C\equiv C\text{—}H \quad \text{Formula } s^{23}$$

$$HO\text{-}(A^3O)_w\text{—}CR^{15}R^{16}\text{—}C\equiv C\text{—}H \quad \text{Formula } s^{24}$$

wherein each of $A^1$, $A^2$ and $A^3$ which are independent of one another, is an alkylene group, each of u and v is an integer of at least 0, (u+v) is an integer of at least 1, and w is an integer of at least 1. In a case where each of u, v and w is at least 2, one type of each $A^1$, $A^2$ and is $A^3$ may be used solely, or two or more types of them may be used in combination.

Each of $R^{11}$ to $R^{16}$ which are independent of one another, is a hydrogen atom or an alkyl group. The alkyl group is preferably a $C_{1-12}$ alkyl group, more preferably a $C_{1-4}$ alkyl group. As specific examples, a methyl group, an ethyl group, a propyl group, a butyl group and an isobutyl may, for example, be mentioned.

The POA chain is preferably a POE chain, a POP chain or a chain containing a POE chain and a POP chain. The number of repeating units in the POA chain is preferably from 1 to 50.

The surfactant $s^2$ is preferably a nonionic surfactant represented by the following Formula $s^{25}$. In the formula $s^{25}$, each of x and y is 0 or an integer of from 1 to 100. One type of a nonionic surfactant represented by the Formula $s^{25}$ may be used alone, or two or more types of the nonionic surfactant represented by the Formula $s^{25}$ may be used in combination.

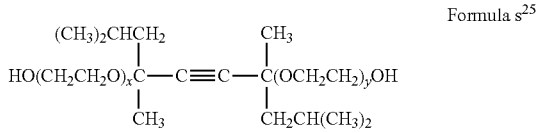

Formula s²⁵

The nonionic surfactant represented by the Formula s²⁵ is preferably a nonionic surfactant wherein x and y are 0, an average of the sum of x and y is from 1 to 4, or an average of the sum of x and y is from 10 to 30.

The POA chain having at least three carbons in the surfactant s³ is preferably a polyoxytetramethylene (hereinafter referred to as POT) and/or a POP chain.

The surfactant s³ is preferably a nonionic surfactant represented by the following Formula s³¹ or Formula s³². Here, g1 is 0 or an integer of from 1 to 200, t is an integer of from 2 to 100, g2 is 0 or an integer of from 1 to 200. In a case where g1 is 0, g2 is an integer of at least 2, and in a case where g2 is 0, g1 is an integer of at least 2. The —$C_3H_6O$— unit may be —$CH(CH_3)CH_2$— or —$CH_2CH(CH_3)$—, or —$CH(CH_3)CH_2$— and —$CH_2CH(CH_3)$— may coexist. The POA chain is a block form.

$HO(CH_2CH_2O)_{g1}(C_3H_6O)_t(CH_2CH_2O)_{g2}H$   Formula S³¹

$HO(CH_2CH_2O)_{g1}(CH_2CH_2CH_2CH_2O)_t(CH_2CH_2O)_{g2}H$   Formula s³²

As specific examples of the surfactant s³, the following compounds may be mentioned.

HO—$(CH_2CH_2O)_{15}$—$(C_3H_6O)_{35}$—$(CH_2CH_2O)_{15}$H,
HO—$(CH_2CH_2O)_8$—$(C_3H_6O)_{35}$—$(CH_2CH_2O)_8$H, HO—$(CH_2CH_2O)_{45}$—$(C_3H_6O)_{17}$—$(CH_2CH_2O)_{45}$H, HO—$(CH_2CH_2O)_{34}$—$(CH_2CH_2CH_2CH_2O)_{28}$—$(CH_2CH_2O)_{34}$H

The surfactant s⁴ is preferably a nonionic surfactant represented by the following formula s⁴¹.

$(R^{17})(R^{18})(R^{19})N(→O)$   Formula s⁴¹

Here, each of $R^{17}$, $R^{18}$ and $R^{19}$ which are independent of one another is preferably a monovalent hydrocarbon group. In the present invention, a surfactant having an amine oxide (N→O) is a nonionic surfactant. One type of the surfactant s⁴ may be used solely, or two or more types of the surfactant s⁴ may be used in combination.

The surfactant s⁴ is preferably a nonionic surfactant represented by the following formula s⁴² from the viewpoint of stable dispersibility.

$(R^{20})(CH_3)_2N(→O)$   Formula s⁴²

$R^{20}$ is a $C_{6-22}$ alkyl group, a $C_{6-22}$ alkenyl group, a phenyl group to which a $C_{6-22}$ alkyl group is bonded or a phenyl group to which a $C_{6-22}$ alkenyl group is bonded, preferably a $C_{8-22}$ alkyl group, a $C_{8-22}$ alkenyl group or a $C_{4-9}$ polyfluoroalkyl group As specific examples of the nonionic surfactant represented by the formula s⁴², the following compounds may be mentioned.

$[H(CH_2)_{12}](CH_3)_2N(→O)$, $[H(CH_2)_{14}](CH_3)_2N(→O)$, $[H(CH_2)_{16}](CH_3)_2N(→O)$, $[H(CH_2)_{18}](CH_3)_2N(→O)$, $[F(CF_2)_6(CH_2)_2](CH_3)_2N(→O)$, $[F(CF_2)_4(CH_2)_2](CH_3)_2N(→O)$.

The substituted phenyl group in the surfactant s⁵ is preferably a phenyl group substituted with a monovalent hydrocarbon group, more preferably a phenyl group substituted with an alkyl group, an alkenyl group or a styryl group.

The surfactant s⁵ is preferably a condensate of a polyoxyethylene mono(alkyl phenyl) ether, a condensate of a polyoxyethylene mono(alkenyl phenyl) ether, a polyoxyethylene mono(alkyl phenyl) ether, a polyoxyethylene mono (alkenyl phenyl) ether, or a polyoxyethylene mono[(alkyl)(styryl)phenyl] ether.

As specific examples of a condensate of a polyoxyethylene mono(substituted phenyl)ether or a polyoxyethylene mono(substituted phenyl)ether, a formaldehyde condensate of a polyoxyethylene mono(nonyl phenyl)ether, a polyoxyethylene mono(nonyl phenyl)ether, a polyoxyethylene mono (octyl phenyl)ether, a polyoxyethylene mono(oleyl phenyl) ether, a polyoxyethylene mono[(nonyl)(styryl)phenyl]ether, a polyoxyethylene mono[(oleyl)(styryl)phenyl]ether, etc. may be mentioned.

The polyol in the surfactant s⁶ is glycerin, sorbitan, sorbit, a polyglycerin, a polyethylene glycol, a polyoxyethylene glyceryl ether, a polyoxyethylene sorbitan ether or a polyoxyethylene sorbit ether.

The surfactant s⁶ may, for example, be a 1:1 (molar ratio) ester of octadecanoic acid and a polyethylene glycol, a 1:4 (molar ratio) ester of an ether of sorbit and a polyethylene glycol and oleic acid, a 1:1 (molar ratio) ester of an ether of a polyethylene glycol and sorbitan and oleic acid, a 1:1 (molar ratio) ester of dodecanoic acid and sorbitan, a 1:1 or 2:1 (molar ratio) ester of oleic acid and decaglycerin or a 1:1 or 2:1 (molar ratio) ester of octadecanoic acid and decaglycerin.

In the present invention, in a case where the surfactant contains a cationic surfactant s⁷, a cationic surfactant which is a substituted ammonium salt is preferably used. The cationic surfactant which is a substituted ammonium salt is preferably an ammonium salt wherein at least one hydrogen atom bonding to a nitrogen atom is substituted with an alkyl group, an alkenyl group, or a POA chain having a hydroxyl group at a terminal, more preferably a compound represented by the following formula s⁷¹.

$[(R^{21})_4N^+]·X^-$   Formula s⁷¹

Here, $R^{21}$ is a hydrogen atom, a $C_{1-22}$ alkyl group, a $C_{2-22}$ alkenyl group, a $C_{1-9}$ fluoroalkyl group or a POA chain having a hydroxyl group at a terminal, four $R^{21}$ may be the same or different, provided that four $R^{21}$ may not be a hydrogen atom at the same time, and $X^-$ is a counter ion.

$R^{21}$ is preferably a $C_{6-22}$ long chain alkyl group, a $C_{6-22}$ long chain alkenyl group or a $C_{1-9}$ fluoroalkyl group. In a case where $R^{21}$ is an alkyl group other than a long chain alkyl group, a methyl group or an ethyl group is preferred. In a case where $R^{21}$ is a POA group, a POE group is preferred. $X^-$ is preferably a chlorine ion, an ethyl sulfate ion or an acetic acid ion.

The compound represented by the formula s⁷¹ may, for example, be monooctadecyl trimethyl ammonium chloride, monooctadecyl dimethylmonoethyl ammonium ethyl sulfate, mono(octadecyl)monomethyl di(polyethylene glycol) ammonium chloride, monofluorohexyl trimethyl ammonium chloride, di(tallow alkyl)dimethyl ammonium chloride or dimethylmonococonut amine sulfate.

In the present invention, in a case where the surfactant contains an ampholytic detergent s⁸, the ampholytic detergent is preferably an alanine, an imidazolinium betaine, an amidobetain or betaine acetate. As a hydrophilic group, $R^{21}$ preferably contains a $C_{6-22}$ long chain alkyl group, a $C_{6-22}$ long chain alkenyl group or a $C_{1-9}$ fluoroalkyl group. As specific examples of the ampholytic detergent s⁸, dodecyl betaine, octadecyl betaine, dodecyl carboxymethyl hydroxyethyl imidazolinium betaine, dodecyl dimethylamino betaine acetate, aliphatic amide propyl dimethyl amino betaine acetate, etc., may be mentioned.

In the present invention, in a case where the surfactant contains an anionic surfactant, a carboxylic acid-containing surfactant, a phosphoric acid-containing surfactant, a sulfonic acid-containing surfactant or an aliphatic acid salt may be mentioned. Specifically, sodium aliphatic acid, potassium aliphatic acid, sodium linear alkyl benzene sulfonate, sodium alkyl ether sulfonate, sodium alpha olefin sulfonate, sodium alkyl sulfonate, sodium lauryl sulfate, sodium polyoxyethylene lauryl ether phosphate, sodium dipolyoxyethylene alkyl ether phosphate, sodium polyoxyethylene alkyl ether acetate, sodium lauroyl methylene alanine, dialkyl sulfosuccinate, alkyl amido sulfosuccinate, polyoxyethylene alkyl ether carboxylate or perfluoroalkyl carboxylate may, for example, be mentioned.

The surfactant (III) may be a block copolymer or a random copolymer of a hydrophilic monomer and/or a fluorine type hydrophobic monomer or a polymer surfactant ($s^9$) made of a hydrophobic modified product of a hydrophilic copolymer.

As specific examples of the surfactant ($s^9$), a random copolymer of a polyethylene glycol(meth)acrylate and a long chain alkyl acrylate, a block or a random copolymer of a polyethylene glycol(meth)acrylate and a fluoro(meth)acrylate, a block or a random copolymer of a vinyl acetate and a long chain alkyl vinyl ether, a block or a random copolymer of a vinyl acetate and a long chain alkyl vinyl ester, a polymer of styrene and maleic acid anhydride, a condensate of polyvinyl alcohol and stearic acid, a condensate of a polyvinyl alcohol and stearyl mercaptan, a condensate of polyarylamine and stearic acid, a condensate of a polyethylene imine and a stearyl alcohol, methyl cellulose, hydroxypropyl methyl cellulose, hydroxy ethyl methyl cellulose, etc. may be mentioned.

The surfactant ($s^9$) may, for example, be MP polymer manufactured by KURARAY CO., LTD. (merchandise number: MP-103, MP-203), SMA resin manufactured by Elfat Chem., Metolose manufactured by Shin-Etsu Chemical Co., Ltd., Epomin RP manufactured by NIPPON SHOKUBAI CO., LTD. or Surflon manufactured by Seimi Chemical Co., Ltd. (merchandise number: S-381, S-393 series), etc.

Further, in a case where a medium is an organic solvent, or a mixing ratio of an organic solvent is high, a block copolymer or a random copolymer of a lipophilic monomer and a fluorine type monomer or a polymer surfactant made of a polyfluoroalkyl modified product of the above copolymers may be used. As specific examples, a copolymer of an alkyl acrylate and a fluoro(meth)acrylate, a copolymer of an alkyl vinyl ether and a fluoroalkyl vinyl ether, etc. may be mentioned. Surflon manufactured by Seimi Chemical Co., Ltd. (merchandise number: S-383, SC-100 series) may, for example, be mentioned.

Particularly, the surfactant (III) comprising the following surfactant (e1) and/or surfactant (e2) and surfactant (e3) is preferably used, and with a small amount of the surfactant at a level of the total of 5 mass % based on the polymer, a stable water dispersion can be obtained. Further, excellent water repellency and water repellent durability can be obtained. Particularly preferably, it is at most 4 mass %, and in such a case, it is very effective.

Surfactant (e1): at least one surfactant selected from a polyoxyalkylene monoalkyl ether, a polyoxyalkylene monoalkenyl ether, a polyoxyalkylene monoalkapolyenyl ether and a polyoxyalkylene monopolyfluoroalkyl ether. Namely, the surfactant (e1) is the above surfactant $s^1$.

Surfactant (e2): a nonionic surfactant made of a compound having at least one carbon-carbon triple bond and at least one hydroxyl group in its molecule. Namely, the surfactant (e2) is the above surfactant $s^2$.

Surfactant (e3): a cationic surfactant. Particularly, the surfactant (e3) is the compound represented by the formula $s^{71}$.

The liquid repellent composition of the present invention may contain an additive (IV). By adding the additive (IV) to a water dispersion containing the copolymer (I) and the copolymer (II), an effect to reduce dynamic surface tension be obtained. Further, on the thermogravimetric analysis, a temperature at which weight attenuation of the additive (IV) is 30 weight % is at most 250° C.

Dynamic surface tension is surface tension at a dynamical gas-liquid interface, and it is measured by so-called maximum bubble pressure method or bubble pressure difference method. In documents such as Journal of Chemical Society, 121, p 858 (1992) and Journal of Colloid and Interface Science, 166, p 6 (1994), its mechanism, measuring method and measuring example are mentioned, and specific measuring apparatus is also commercially available.

The thermogravimetric analysis can be carried out by means of a commercially available thermogravimetric analysis apparatus (for example, TG-DTA 2000S manufactured by Bruker AXS K.K. and Pyris 1 TGA, manufacture by PerkinElmer Japan Co., Ltd.). It can be carried out by a method that about 10 mg of a sample is taken in a sampling cup made of aluminum, a temperature is raised from room temperature to 400° C. at a rate of 10.0° C./minute, and weight change is measured.

By adding the additive (IV) to a water dispersion containing the copolymer (I) and the copolymer (II), the effect to reduce dynamic surface tension can be obtained, whereby permeability and wettability of the liquid repellent composition to a substrate can be improved, and excellent water repellency, oil repellency and durability can be obtained. Particularly, with respect to a substrate having a surface made of polyester fiber, adherence ratio at a time of processing is improved, and particularly excellent effects can be obtained. The additive (IV) is preferably used in an amount of at most 1 mass % based on the water dispersion so that dynamic surface tension can be reduced at least 5 mN/m. Further, volatility of the additive (IV) is high such that its weight attenuation is 30 weight % at a temperature of at most 250° C. In a case where a substrate is processed by coating with, immersing in or spraying a water dispersion composition of the liquid repellent composition, and dried at least 40° C., liquid repellency can be easily developed, since liquid is not likely to remain on the substrate.

The additive (IV) may be an aqueous solvent and preferably a compound having at least one hydrophilic group (for example, a hydroxyl group or an oxyalkylene group such as oxyethylene or oxypropylene), for example an alcohol such as 2-propanol or ether. Further, one, two or more selected from a polyoxyalkylenemonoalkyl ether, a polyoxyalkylenemonoalkenyl ether, a polyoxyalkylenemonopolyfluoroalkyl ether and the above nonionic surfactant represented by the following formula $s^{25}$ (wherein each of x and y is 0 or an integer of from 1 to 100) may be used in combination.

Formula $s^{25}$

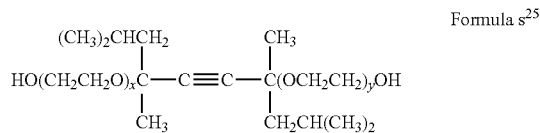

Particularly, among 2-propanol, polyoxyalkylenemonoalkyl ether and the nonionic surfactant represented by the formula s$^{25}$, one wherein x and y is 0, and an average of the sum of x and y is from 1 to 4 is preferred.

For initiating the polymerization reaction e.g. heat, light, radiation, a radical initiator or an ionic polymerization initiator, may preferably be used. Particularly, a water soluble or an oil soluble radical polymerization initiator is preferred, and conventional initiators such as an azo type polymerization initiator, a peroxide type polymerization initiator or a redox type polymerization initiator may be used, depending on a polymerization temperature. As the polymerization initiator, an azo compound is particularly preferred, and in a case where a polymerization is carried out in a medium using water, a salt of an azo compound is more preferred. The polymerization temperature is preferably from 20 to 150° C.

For the polymerization reaction, chain transfer agents may be used. The molecular weight controller is preferably an aromatic compound or a mercaptan, particularly preferably an alkyl mercaptan. As specific examples, n-octyl mercaptan, n-dodecyl mercaptan, tert dodecyl mercaptan, stearyl mercaptan, α-methyl styrene dimer (CH$_2$=CPhCH$_2$C(CH$_2$)$_3$Ph, Ph is a phenyl group), etc. may preferably be mentioned.

As a case requires, in the liquid repellent composition of the present invention, various additives may be employed, such as penetrants, antifoaming agents, water absorption agents, antistatic agents, antiwrinkle agents, softeners, film forming assistants, water soluble polymers such as polyacrylamide or polyvinyl alcohol, thermosetting agents such as melanin resins or urethane resin, an epoxy curing agent such as dihydrazide isophthalate, dihydrazide adipate, dihydrazide sebacate, dihydrazide didodecanoate, 1,6-hexamethylenebis(N,N-dimethyl semicarbazide), 1,1,1',1'-tetramethyl-4,4'-(methylene-di-paraphenylene)disemicarbazide or a spiroglycol or a compound having a function as a stabilizer for synthetic resin or fiber. Further, as a case requires, a catalyst may be used in combination in order to accelerate thermal curing or crosslinking.

By controlling an amount to be added, an addition method or a treatment condition, depending on characteristics of a substrate, effects of these additives can be further improved. For example, in the case of a cloth treatment, in order to improve durability, a melanin resin and its catalyst are conventionally used, however, their optimum amounts are variable depending on types of cloth. As a result of extensive study, in the composition of the present invention, when an amount of a catalyst to be added to a polyester cloth is ¹⁄₂₀ to ⅕ of nylon fiber, high performance can be obtained.

The liquid repellent composition of the present invention can be applied to objects to be treated by a conventional method. In general, a method that the liquid repellent composition is dispersed and diluted in an organic solvent or water and applied on a surface of objects to be treated by dipped fabric, spray coating, foam coating, etc., followed by drying, is employed. As a case requires, it is possible to employ a processing method by Exhaust method that pH is controlled at a level of at most 7, objects to be treated is coated with a treatment solution, and thermal treatment is carried out, followed by laundering with water and dehydration. In the case of the dipped fabric, a fluoropolymer concentration in a treatment solution is preferably from 0.05 to 10 mass %. In the case of the spray coating, a fluoropolymer concentration in a treatment solution is preferably from 0.1 to 5 mass %. In the case of the Exaust method, a fluoropolymer concentration in a treatment solution is preferably from 0.05 to 10 mass %.

Articles having a liquid repellent film formed by using the liquid repellent composition of the present invention are not particularly restricted, and natural fiber, synthetic fiber, fiber made of mixed fabric of natural fiber, synthetic fiber, etc., nonwoven fabric, resins, paper, leather, inorganic materials such as metals, stone, concrete, gypsum and glass may, for example, be mentioned.

If articles are treated with the liquid repellent composition of the present invention, in the case of fiber products, since a coating film is soft, hand of products becomes soft, and it is possible to impart high quality water repellency and oil repellency to the products. Further, a surface is excellent in adhesion, and it is possible to impart water and oil repellency by curing at a low temperature. Further, properties deterioration due to abrasion or laundering can be prevented, and initial properties at a time of processing can be maintained. Further, in the case of paper treatment, even under dry condition, it is possible to impart excellent size property, water repellent property and oil resistance to paper. In the case of the resin, is glass or metal surface treatment, a water repellent and oil repellent coating film excellent in an adherence property to a substrate and a film forming property can be formed.

EXAMPLES

Now, the present invention will be described in further detail with reference to Examples, but it should be understood that the present invention is by no means restricted thereto.

Preparation Example 1

98.6 g of a homopolymer of C$_6$F$_{13}$C$_2$H$_4$OCOC(CH$_3$)=CH$_2$ (melting point of a fine crystal of a homopolymer (hereinafter referred to as T$_m$): none, glass transitional point of a homopolymer (hereinafter referred to as T$_g$): 51.5° C., hereinafter referred to as FMA), 5.5 g of an alkyl methacrylate (VMA-70, manufactured by NOF CORPORATION, an alkyl group is linear, and alkyl chain length is C18:C20:C22=15/15/70 in GC surface ratio, hereinafter referred to as VMA), 2.19 g of a surfactant of a polyoxyethylene oleyl ether (about 20 moles of ethylene oxide adduct, hereinafter referred to as PEO-25), 1.09 g of acetylene glycol ethylene oxide adduct (10 moles of ethylene oxide adduct, hereinafter referred to as AGE-10), 0.44 g of stearyl trimethyl ammonium chloride (hereinafter referred to as STMAC), 175 g of ion exchanged water, 11 g of dipropylglycol (hereinafter referred to as DPG) and 0.5 g of stearyl mercaptan (hereinafter referred to as StSH) were added to a glass beaker, and the beaker was heated at 60° C. for 30 minutes, followed by mixing by a homomixer (BIO MIXER, manufactured by Nippon Seiki Co., Ltd.) to obtain a mixed liquid.

While maintaining the temperature at 60° C., the obtained mixed liquid was treated at 40 MPa by means of a high pressure emulsifier (MINILABO, manufactured by APV Lannie) to obtain a emulsified liquid. 250 g of the obtained emulsified liquid was added in a stainless steel reactor, 0.3 g of dimethyl 2,2'-azobis (2-methylpropionate) (hereinafter referred to as V601) as an initiator was added thereto, and the reactor was cooled to at most 30° C. Gas phase was exchanged with nitrogen, and 5.5 g of a vinyl chloride monomer (hereinafter referred to as VCM) was charged, and polymerization reaction was carried out with stirring at 65° C. for 15 hours to obtain an emulsion (solid component concentration: 34.0 mass %).

Preparation Examples 2 and 3

The same polymerization was carried out as in Preparation Example 1, except that the composition was changed to a composition as shown in Table 1, and an emulsion was obtained. Monomers other than VCM were charged before carrying out emulsification by a high pressure emulsifier and mixed by a homomixer.

Preparation Example 4

The same polymerization was carried out as in Preparation Example 1, except that 3.27 g of AGE-10 was used as a surfactant, and an emulsion (solid component concentration: 34.2%) was obtained. Monomers other than VCM were charged before carrying out the emulsification by a high pressure emulsifier and mixed by a homomixer.

Preparation Example 5

The same polymerization was carried out as in Preparation Example 1, except that 1.09 g of acetylene glycol ethylene oxide adduct (the number of mols of ethylene oxide adduct: 30 mols, hereinafter referred to as AGE-30), 1.09 g of AGE-10 and 1.09 g of PEO were used as a surfactant, and an emulsion (solid component concentration: 34.2%) was obtained. Monomers other than VCM were charged before carrying out the emulsification by a high pressure emulsifier and mixed by a homomixer.

Preparation Examples 6 to 9

The same polymerization was carried out as in Preparation Example 1, except that the composition was changed to a composition as shown in Table 1, and an emulsion was obtained. Monomers other than VCM were charged before carrying out the emulsification by a high pressure emulsifier and mixed by a homomixer.

The symbols in Table 1 are as shown below.
C4FMA: $C_4F_9C_2H_4OCOC(CH_3)=CH_2$ ($T_m$: none, $T_g$: 41° C.)
STA: stearyl acrylate
D-BI: 3,5-dimethylpyrazole adduct of 2-isocyanate ethyl methacrylate (see Ka 3)
DAAM: diacetone acrylamide
DOM: dioctyl maleate
GMA: glycidyl methacrylate
CHMA: cyclohexyl methacrylate
PEO-30: polyoxyethylene oleyl ether (about 26 mols adduct of ethylene oxide)
FDMC: palm alkyl dimethyl amine acetate
EPO-40: ethylene oxide propylene oxide polymer (40% of ethylene oxide is contained)
VA-061A: 2,2'-azobis[2-(2-imidazoline-2-yl)propane]acetate

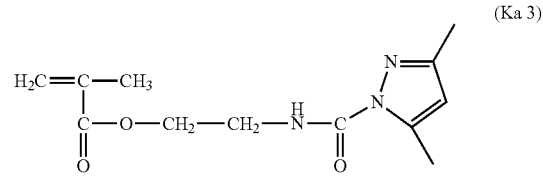 [SMILES: C=C(C)C(=O)OCCNC(=O)n1nc(C)cc1C]

(Ka 3)

Preparation Example 10

203.0 g of a water dispersion of a copolymer (I) (solid component concentration: 34.0%, the copolymer composition produced in Preparation Example 1 was used as the copolymer (I)) and as the copolymer (II), 12.5 g of FMA, 8.28 g of CHMA and 8.8 g of GMA were charged to a stainless steel autoclave.

Further, 0.29 g of StSH, 2.7 g of DPG and 44.4 g of water were added thereto so that the total solid component became

TABLE 1

| | | | Charged weight/g | | | | | | |
|---|---|---|---|---|---|---|---|---|---|
| | | | Prep Ex. 1 | Prep Ex. 2 | Prep Ex. 3 | Prep Ex. 6 | Prep Ex. 7 | Prep Ex. 8 | Prep Ex. 9 |
| Monomer | (a) | FMA | 98.6 | 96.4 | — | 42.1 | — | 34.1 | 76.4 |
| | | C4FMA | — | — | 94.2 | — | 42.1 | — | — |
| | (b) | STA | — | — | — | — | — | — | 13.4 |
| | | VMA | 5.5 | 5.5 | 5.5 | — | — | — | — |
| | (c) | D-BI | — | — | — | — | — | — | 4.1 |
| | | DAAM | — | — | 4.4 | — | — | — | — |
| | | GMA | — | — | — | 30 | 30 | 24 | — |
| | (d) | VCM | 5.5 | 5.5 | 5.5 | — | — | 20 | 9.3 |
| | | DOM | — | 2.2 | — | — | — | — | — |
| | | CHMA | — | — | — | 28 | 28 | 22 | — |
| Surfactant (III) | (e1) | AGE-10 | 1.1 | 1.1 | 1.1 | 1 | 1 | 1 | 1 |
| | | EPO-40 | — | — | — | — | — | — | 0.5 |
| | (e2) | PEO-30 | — | — | — | 2 | 2 | 2 | 2.5 |
| | | PEO-25 | 2.2 | 2.2 | 2.2 | — | — | — | — |
| | (e3) | FDMC | — | — | — | 0.5 | 0.5 | 0.5 | — |
| | | STMAC | 0.44 | 0.44 | 0.44 | — | — | — | 0.52 |
| Solvent | | Water | 175 | 158 | 158 | 181.6 | 181.6 | 181.6 | 160 |
| | | DPG | 11 | 11 | 11 | 10 | 10 | 10 | 31 |
| Molecular weight controller | | StSH | 0.5 | 0.5 | 0.5 | 1 | 1 | 1 | 1 |
| Initiator | | V-601 | 0.3 | 0.3 | 0.3 | 0.4 | 0.4 | 0.4 | — |
| | | VA-061A | — | — | — | — | — | — | 0.5 |
| Solid component concentration (mass %) | | | 34 | 34.2 | 34 | 32.3 | 32 | 31.8 | 31.2 |

35 mass %. The mixture was stirred at 60° C. for one hour and cooled. Then, 0.05 g of V-59 (2-2'-azobis(2-methyl butyronitrile)) was added, followed by flushing with nitrogen, and then polymerization reaction was carried out at 65° C. for 15 hours. After cooling, 0.02 g of V-59 was added, and interior of the autoclave was degassed and nitrogen filled, and then the reaction was matured at 65° C. for 4 hours. After cooling, a dispersion was obtained. Solid component concentration was 35.0 mass %. Copolymer particles were observed by a transmission electron microscope. As a result, it was confirmed that the copolymer (I) existed as core-shell type fine particles which exist in the inside of the copolymer (II), and a part of monomers polymerized in a water phase.

Preparation Examples 11 to 14

Polymerization reactions of Preparation Examples 11 to 14 were carried out in the same manner as in Preparation Example 10, except that as the copolymer (II), compounds shown in Table 2 with mass (unit: g) of the compound shown in Table 2 were used, and emulsions were obtained. VCM was charged in a reactor after replaced with nitrogen. In Table 2, C6FMA is $C_6F_{13}C_2H_4OCOC(CH_3)\!=\!CH_2$, PE350 is a polyethylene glycol methacrylate, and M90G is methoxy polyethylene glycol methacrylate.

%) and as the copolymer (II), 11.9 g of FMA, 7.7 g of CHMA and 8.4 g of GMA were charged to a stainless steel autoclave.

Further, 0.33 g of StSH, 3.15 g of DPG and 52.5 g of water were added thereto so that the total solid component became 35 mass %. The mixture was stirred at 60° C. for one hour and cooled. Then, 0.04 g of V-59 was added, followed by replacing with nitrogen, and then 7.0 g of VCM was added, and polymerization reaction was carried out at 65° C. for 4 hours. After cooling, 0.02 g of V-59 was added, followed by nitrogen replacement, and then the reaction was matured at 65° C. for 4 hours. After cooling, a dispersion was obtained. Solid component concentration was 35.0 mass %.

Preparation Example 18

Polymerization reaction was carried out in the same manner as in Preparation Example 3, except that as a surfactant, 5.78 g of PEO-30 and 0.66 g of STMAC were used, instead of PEO-25, and an emulsion (solid component concentration: 34.8 mass %) was obtained.

Preparation Example 19

Polymerization reaction was carried out in the same manner as in Preparation Example 5, except that instead of

TABLE 2

| | | | Charged weight/g | | | | |
|---|---|---|---|---|---|---|---|
| | | | Prep Ex. 10 | Prep Ex. 11 | Prep Ex. 12 | Prep Ex. 13 | Prep Ex. 14 |
| Monomer | (a) | FMA | 12.5 | — | — | — | — |
| | | C6FMA | — | 10.1 | 12.3 | 9.8 | 12.2 |
| | (c) | GMA | 8.8 | 7.1 | 8.7 | 6.8 | 8.6 |
| | (d) | VCM | — | 5.9 | — | 5.9 | — |
| | | CHMA | 8.28 | 6.5 | 8.1 | 6.2 | 8 |
| Surfactant | $(s^9)$ | PE350 | — | — | 0.9 | 0.9 | — |
| | | M90G | — | — | — | — | 0.9 |
| Solvent | | Water | 44.4 | 44.4 | 44.4 | 44.4 | 44.4 |
| | | DPG | 2.7 | 2.7 | 2.7 | 2.7 | 2.7 |
| Molecular weight controller | | StSH | 0.3 | 0.3 | 0.3 | 0.3 | 0.3 |
| Initiator | | V-59 | 0.05 | — | 0.05 | 0.05 | 0.05 |
| | | VA-061A | — | 0.05 | — | — | — |
| Solid component concentration (mass %) | | | 35 | 34.8 | 34.8 | 34.8 | 34.8 |

Preparation Example 15

Polymerization reaction was carried out in the same manner as in Preparation Example 10, except that as the copolymer (I), the polymer prepared in Preparation Example 4 was used, and an emulsion (solid component concentration: 34.8 mass %) was obtained.

Preparation Example 16

Polymerization reaction was carried out in the same manner as in Preparation Example 10, except that as the copolymer (I), the polymer prepared in Preparation Example 5 was used, and an emulsion (solid component concentration: 34.8 mass %) was obtained.

Preparation Example 17

409.4 g of a water dispersion of the copolymer (I) (the copolymer obtained in Preparation Example 5 was used as the copolymer (I), solid component concentration: 34.2 mass 98.6 g of FMA, 97.5 of FMA and 1.1 g of a polycaprolactone ester of hydroxymethyl methacrylate (referred to as PFM 3, average adduct mol number of caprolactone is 3.7) were used, and an emulsion (solid component concentration: 34.8 mass %) was obtained.

Preparation Example 20

Polymerization reaction was carried out in the same manner as in Preparation Example 10, except that as the copolymer (I), the copolymer obtained in Preparation Example 19 was used, and an emulsion (solid component concentration: 35.2 mass %) was obtained.

Preparation Example 21

Polymerization reaction was carried out in the same manner as in Preparation Example 10, except that as the copolymer (I), the copolymer obtained in Preparation Example 19 was used, and instead 12.5 g of FMA, which is the copolymer (I) in Preparation Example 10, 12.2 g of FMA and 0.3 g of PFM were used, and an emulsion (solid component concentration: 35.1 mass %) was obtained.

Preparation Examples 22 to 26

Polymerization reactions were carried out in the same manner as in Preparation Example 1, except that compounds shown in Table 3 were used with mass (unit: g) shown in Table 3, and emulsions were obtained. In Table 3, EPO-10 is ethylene oxide propylene oxide polymer (containing 10% ethylene oxide), and DOSH is dodecyl mercaptan.

TABLE 3

|  |  |  | Charged weight/g |  |  |  |  |
|---|---|---|---|---|---|---|---|
|  |  |  | Prep Ex. 22 | Prep Ex. 23 | Prep Ex. 24 | Prep Ex. 25 | Prep Ex. 26 |
| Monomer | (a) | C6FMA | 32.5 | 32.5 | 75.8 | 75.8 | 43.3 |
|  | (b) | STA | 72.5 | 72.5 | 29.2 | 29.2 | 61.6 |
|  | (c) | D-BI | 3.2 | 1.1 | 3.2 | 1.1 | 3.2 |
|  |  | TAC | — | 2.2 | — | 2.2 | — |
| Surfactant (III) | (e1) | AGE-10 | 3.2 | — | — | — | — |
|  |  | EPO-10 | 2.2 | 2.2 | 2.2 | 2.2 | 2.2 |
|  | (e2) | PEO-30 | — | 3.2 | 3.2 | 3.2 | 3.2 |
|  | (e3) | STMAC | 1.1 | 1.1 | 1.1 | 1.1 | 1.1 |
| Solvent |  | DPG | 54 | 54 | 54 | 54 | 54 |
|  |  | Water | 130 | 130 | 130 | 130 | 130 |
| Molecular weight controller |  | DOSH | 1.1 | 1.1 | 1.1 | 1.1 | 1.1 |
| Initiator |  | VA-061A | 0.5 | 0.5 | 0.5 | 0.5 | 0.5 |
| Solid component concentration (mass %) |  |  | 35.7 | 35 | 36.1 | 35.8 | 35 |

Examples 1 to 24

The water dispersions obtained in Preparation Examples 1 to 21 were diluted with distilled water in accordance with Tables 4 and 5, to obtain 200 g of each of test liquids having a solid component concentration of 2 mass % shown in Examples 1 to 24. In Examples 1 to 5 and 22 to 24, the copolymer (I) and the copolymer (II) were mixed as separate particles, and in Examples 6 to 13, 15, 16 and 21, the copolymer (I) and the copolymer (II) were used as the core-shell type. In Example 14, core-shell type particles and the copolymer (II) were mixed. Examples 17 and 18 are comparative examples wherein only the copolymer (I) was used, and Examples 19 and 20 are comparative examples wherein only the copolymer (II) was used.

In Tables 4 and 5, the mass ratios of the polymerized unit (a) and the polymerized unit (b) in the copolymer (I) to the copolymer (I) are represented as [$a_1$] and [$b_1$] respectively. Further, the mass ratios of the polymerized unit (a) and the polymerized unit (c) in the copolymer (II) to the copolymer (II) are represented as [$a_2$] and [$c_2$] respectively. Further, the copolymer (I)/the copolymer (II) is [mass ratio of the copolymer (I)]/[mass ratio of the copolymer (II)]. Further, the respective mass ratios of polymerized units in the total copolymers (the copolymer (I)+the copolymer (II), are represented as [a], [b], [c] and [d], respectively.

Further, numerals in ( ) in Tables 4 and 5 are solid component concentrations at a time of mixing. Further, 0.02 g of ADH was added as an aqueous solution to a test liquid. Additives other than ADH were prepared so as to have concentrations shown in Tables. In a nylon cloth processing, Sumitex resin M-3 (hereinafter referred to as M-3) and Sumitex accelerator ACX (hereinafter referred to as ACX) were added so as to be 0.5 mass % to each treatment bath respectively. Further, in polyester cloth processing, M-3 and ACX were added so as to be 0.5 mass % and 0.05 mass % to each treatment bath respectively. Symbols in Tables are as shown below, numerals in ( ) are solid component concentrations. Surfynol 104-PG 50 used as an additive (manufactured by Air Products and Chemicals, Inc., herein after referred to as AGE) was diluted with dipropyl glycol to 5 mass % and added to a treatment bath so as to be mass % shown in Tables. Surfynol 440 (manufactured by Air Products and Chemicals, Inc., herein after referred to as AGE-4) and PE-30 were added as 5 mass % aqueous solutions to a treatment bath so as to be mass % shown in Tables.

M-3: Sumitex resin M-3, manufactured by Sumitomo Chemical Co. Ltd

ACX: Sumitex accelerator ACX, manufactured by Sumitomo Chemical Co., Ltd.

MF: Meikanate MF, manufactured by Meisei Chemical Works, Ltd.

TP-10: Meikanate TP-10, manufactured by Meisei Chemical Works, Ltd.

NPB: Meikanate NPB-211, manufactured by Meisei Chemical Works, Ltd.

ADH: adipate dihydrazide

TABLE 4

|  | Example | 1 | 2 | 3 | 4 | 5 | 6 | 7 | 8 | 9 | 10 | 11 | 12 |
|---|---|---|---|---|---|---|---|---|---|---|---|---|---|
| Preparation Example | Copolymer (I) | 1 (75) | 1 (70) | 1 (70) | 3 (70) | 2 (70) |  |  |  |  |  |  |  |
|  | Copolymer (II) | 9 (25) | 6 (30) | 8 (30) | 7 (30) | 8 (30) |  |  |  |  |  |  |  |
|  | Core shell type (I + II) |  |  |  |  |  | 10 | 11 | 12 | 13 | 14 | 15 | 16 |

TABLE 4-continued

| | Example | 1 | 2 | 3 | 4 | 5 | 6 | 7 | 8 | 9 | 10 | 11 | 12 |
|---|---|---|---|---|---|---|---|---|---|---|---|---|---|
| Combine agent | M-3/ACX | ○ | ○ | ○ | ○ | ○ | ○ | ○ | | | ○ | ○ | ○ |
| | ADH (g) | | | | 0.02 | | | | | | | | |
| | NBP (mass %) | | | | | 0.4 | | | 0.8 | | | | |
| | TP-10 (mass %) | | | | | | | | | 0.8 | | | |
| | MF (mass %) | | | | 0.4 | | | | | | 0.8 | | |
| Additive (IV) | AGE (mass %) | 1 | | 1 | 1 | 1 | 1 | 1 | | | | 1 | 1 |
| | AGE-4 (mass %) | | 1 | | | | | | 1 | 1 | 1 | | |
| | PEO-30 (mass %) | | | | | | | | | | | | |
| Copolymer (I) | [$a_1$] (mass %) | 90 | 90 | 90 | 86 | 88 | 90 | 90 | 90 | 90 | 90 | 90 | 90 |
| | [$b_1$] (mass %) | 5 | 5 | 5 | 5 | 5 | 5 | 5 | 5 | 5 | 5 | 5 | 5 |
| Copolymer (II) | [$a_2$] (mass %) | 74 | 42 | 34 | 42 | 34 | 42 | 34 | 41 | 33 | 41 | 42 | 42 |
| | [$c_2$] (mass %) | 4 | 30 | 24 | 30 | 24 | 30 | 24 | 29 | 23 | 29 | 30 | 30 |
| [$a_1$] − [$a_2$] | | 16 | 48 | 56 | 44 | 54 | 48 | 56 | 49 | 57 | 49 | 48 | 48 |
| Copolymer (I)/Copolymer (II) | | 75/25 | 70/30 | 70/30 | 70/30 | 70/30 | 70/30 | 70/30 | 70/30 | 70/30 | 70/30 | 70/30 | 70/30 |
| Copolymer (I) + copolymer (II) | [a] (mass %) | 86 | 75.6 | 73.2 | 72.8 | 71.8 | 75.6 | 73.2 | 75.3 | 72.9 | 75.3 | 75.6 | 75.6 |
| | [b] (mass %) | 7 | 3.5 | 3.5 | 3.5 | 3.5 | 9 | 7.2 | 8.7 | 6.9 | 8.7 | 9 | 9 |
| | [c] (mass %) | 1 | 9 | 7.2 | 11.8 | 7.2 | 3.5 | 3.5 | 3.5 | 3.5 | 3.5 | 3.5 | 3.5 |
| | [d] (mass %) | 6 | 11.9 | 16.1 | 11.9 | 17.5 | 11.9 | 16.1 | 12.5 | 16.7 | 12.5 | 11.9 | 11.9 |

TABLE 5

| | Example | 13 | 14 | 15 | 16 | 17 | 18 | 19 | 20 | 21 | 22 | 23 | 24 |
|---|---|---|---|---|---|---|---|---|---|---|---|---|---|
| Preparation Example | Copolymer (I) | | | | | 1 | 2 | | | | 18 (70) | 1 (25) | 1 (50) |
| | Copolymer (II) | | 8 (30) | | | | | 8 | 8 | | 7 (30) | 9 (75) | 9 (50) |
| | Core shell type (I + II) | 17 | 16 (70) | 20 | 21 | | | | | 13 | | | |
| Combine agent | M-3/ACX | ○ | ○ | | | ○ | ○ | ○ | | ○ | ○ | ○ | ○ |
| | ADH (g) | | | | | | | | | | | | |
| | NBP (mass %) | | | | | | | | | | | | |
| | TP-10 (mass %) | | | | | | | | | | | | |
| | MF (mass %) | | | 0.8 | 0.8 | | | | 0.8 | | | | |
| Additive (IV) | AGE (mass %) | 1 | 1 | 1 | 1 | | | | | | | 1 | 1 |
| | AGE-4 (mass %) | | | | | | | | | | | | |
| | PEO-30 (mass %) | | | | | | | | 1 | 1 | | | |
| Copolymer (I) | [$a_1$] (mass %) | 90 | 90 | 89 | 89 | 90 | 88 | — | — | 90 | 86 | 90 | 90 |
| | [$b_1$] (mass %) | 5 | 5 | 5 | 5 | 5 | 5 | — | — | 5 | 5 | 5 | 5 |
| Copolymer (II) | [$a_2$] (mass %) | 34 | 37.3 | 42 | 42 | — | — | 34 | 34 | 33 | 42 | 74 | 74 |
| | [$c_2$] (mass %) | 24 | 26.5 | 30 | 31 | — | — | 24 | 24 | 23 | 30 | 4 | 4 |
| [$a_1$] − [$a_2$] | | 56 | 52.7 | 47 | 47 | — | — | — | — | 57 | 44 | 16 | 16 |
| Copolymer (I)/Copolymer (II) | | 80/20 | 49/51 | 70/30 | 70/30 | — | — | — | — | 70/30 | 70/30 | 25/75 | 50/50 |
| Copolymer (I) + copolymer (II) | [a] (mass %) | 78.8 | 63.1 | 74.9 | 74.6 | 90 | 88 | 34 | 34 | 72.9 | 72.8 | 78 | 82 |
| | [b] (mass %) | 4.8 | 2.5 | 3.5 | 3.5 | 5 | 5 | — | — | 6.9 | 3.5 | 11 | 9 |
| | [c] (mass %) | 4 | 13.5 | 9.7 | 10 | — | — | 24 | 24 | 3.5 | 11.8 | 3 | 2 |
| | [d] (mass %) | 12.4 | 20.9 | 11.9 | 11.9 | 5 | 7 | 42 | 42 | 16.7 | 11.9 | 8 | 7 |

Preparation of Test Clothes

Dyed nylon clothes or dyed polyester clothes were immersed with test solutions obtained in Examples 1 to 24 and wringed out so that each of wet pick up became 70 mass % and 60 mass %. The clothes were dried at 110° C. for 90 seconds and then dried at 170° C. for 60 seconds to prepare test clothes A.

Evaluation Method of Water Repellency

Water repellency of the test clothes A was evaluated in accordance with JIS-L1092, spray test (provided that water amount of a spray was 0.25 L or 1 L, and water temperature was 27° C.). Water repellency is represented by water repellency degree shown in Table 6. +(−) with water repellency degree means that each property is slightly good (poor).

TABLE 6

| Water repellency | State |
|---|---|
| 100 | No wetting or water-droplets adhesion on the surface |

TABLE 6-continued

| Water repellency | State |
|---|---|
| 90 | Slight water droplets adhesion on a surface |
| 80 | Partical spotty wetting on the surface |
| 70 | Wetting on half of the surface |
| 50 | Wetting over the entire surface |
| 0 | Complete wetting on both surfaces |

Evaluation Method of Laundering Durability

Laundering durability of the test clothes A was evaluated in accordance with JIS-L0217 attached list 103. With respect to the nylon clothes, 5 launderings (HL-5) was repeated 16 times. With respect to the polyester clothes, HL-5 was repeated 40 times. Then, the clothes were dried at 90° C. for 15 minutes, followed by evaluation of water repellency.

Evaluation Method of Rainfall Test

Rainfall test of the test clothes A were carried out in accordance with JIS-L-1092(C) (Bundesmann test), rainfall condition was that rainfall amount: 100 cc/minute, rainfall temperature: 20° C., and rainfall time: 10 minutes. Evaluation is represented by five grades of 1 to 5. With respect to laundering durability, laundering was repeated in the same manner as in the above evaluation, the clothes were then pressed at 130° C. for 15 seconds and then evaluated. DKUSUN AF-43T was used as a press machine. The higher the point is, the better the water repellency means. +(−) with points means that each property is slightly good (poor).

Evaluation results of Examples 1 to 24 are shown in Tables 7 and 8.

TABLE 7

Nylon

| | Initial | | | HL-5 16 times | | |
|---|---|---|---|---|---|---|
| Ex. | 0.25 L | 1 L | Bundesmann | 0.25 L | 1 L | Bundesmann |
| 1 | 100 | 100 | 5 | 100 | 90+ | 4+ |
| 2 | 100 | 100 | 5 | 90+ | 90 | 4 |
| 3 | 100 | 100 | 5 | 90+ | 90 | 4 |
| 4 | 100 | 90+ | 5 | 90 | 80+ | 4 |
| 5 | 100 | 100 | 5 | 90+ | 90+ | 4 |
| 6 | 100 | 100 | 5 | 100− | 90+ | 4 |
| 7 | 100 | 100 | 5 | 100− | 90+ | 4 |
| 8 | 100 | 100 | 5 | 100− | 90+ | 4 |
| 9 | 100 | 100 | 5 | 100− | 90+ | 4 |
| 10 | 100 | 100 | 5 | 100− | 90+ | 4 |
| 11 | 100 | 100 | 5 | 100 | 100 | 5 |
| 12 | 100 | 100 | 5 | 100− | 100− | 4 |
| 13 | 100 | 100 | 5 | 100 | 100 | 4 |
| 14 | 100 | 100 | 5 | 100 | 100 | 4 |
| 15 | 100 | 100 | 5 | 100 | 100 | 5 |
| 16 | 100 | 100 | 5 | 100 | 100 | 5 |
| 17 | 100 | 90 | 4 | 70 | 0 | 1 |
| 18 | 100 | 90 | 3 | 50 | 0 | 1 |
| 19 | 100 | 90 | 4 | 90+ | 80− | 3 |
| 20 | 100 | 90 | 4 | 90 | 70+ | 2+ |
| 21 | 100 | 90 | 4+ | 100− | 80+ | 3 |
| 22 | 90+ | 90− | 4+ | 90− | 80+ | 3 |
| 23 | 100 | 100 | 5 | 100 | 100− | 4 |
| 24 | 100 | 100− | 5 | 100 | 100− | 4 |

TABLE 8

Polyester

| | Initial | | | HL-5 40 times | | |
|---|---|---|---|---|---|---|
| Ex. | 0.25 L | 1 L | Bundesmann | 0.25 L | 1 L | Bundesmann |
| 1 | 100 | 100 | 5 | 100 | 100− | 4+ |
| 2 | 100 | 100 | 5 | 100 | 100− | 4 |
| 3 | 100 | 100 | 5 | 100 | 90+ | 4 |
| 4 | 100 | 100 | 5 | 100− | 90 | 4 |
| 5 | 100 | 100 | 5 | 100 | 90 | 4 |
| 6 | 100 | 100 | 5 | 100 | 100− | 4 |
| 7 | 100 | 100 | 5 | 100 | 90+ | 4 |
| 8 | 100 | 100 | 5 | 100− | 90+ | 4 |
| 9 | 100 | 100 | 5 | 100− | 90+ | 4 |
| 10 | 100 | 100 | 5 | 100− | 90+ | 4 |
| 11 | 100 | 100 | 5 | 100 | 100 | 5 |
| 12 | 100 | 100 | 5 | 100 | 100 | 4+ |
| 13 | 100 | 100 | 5 | 100 | 100 | 5 |
| 14 | 100 | 100 | 5 | 100 | 100 | 5 |
| 15 | 100 | 100 | 5 | 100 | 100 | 5 |
| 16 | 100 | 100 | 5 | 100 | 100 | 5 |
| 17 | 100 | 100 | 5 | 70 | 0 | 1 |
| 18 | 100 | 90 | 5 | 70 | 0 | 1 |
| 19 | 100 | 90 | 5 | 90 | 90− | 3 |
| 20 | 100 | 90 | 4 | 90 | 80 | 3 |
| 21 | 100 | 90 | 5 | 100− | 80+ | 3 |
| 22 | 100 | 90 | 4 | 90 | 80 | 3 |
| 23 | 100 | 100 | 5 | 100 | 100 | 4− |
| 24 | 100 | 100 | 5 | 100 | 100 | 5 |

Examples 25 to 29

The water dispersions obtained in Preparation Examples 22 to 26 were adjusted in accordance with Table 9 so that in the case of the polyethylene terephthalate, a solid component concentration became 0.6 mass %, and in the case of the cotton, a solid component concentration became 1.0 mass %. Each of M-3/ACX was adjusted so as to be a solid component concentration of 0.3 mass % in a processing solution. Test clothes were treated in the same manner as in Examples 1 to 24, and then evaluation was carried out in accordance with the spray test of JIS-L1092 and the laundering durability test of HL-5. The cotton was wringed so that wet pick up became 65 mass %. In Examples 25 to 28, the copolymer (I) and the copolymer (II) were used as separate particles, and Example 29 is comparative example wherein copolymers which contain the polymerized units (a), (b) and (c) in one particle are used.

In Table 9, the mass ratios of the polymerized unit (a) and the polymerized unit (b) in the copolymer (I) to the copolymer (I) are represented as $[a_1]$ and $[b_1]$ respectively. Further, the mass ratios of the polymerized unit (a) and the polymerized unit (c) in the copolymer (II) to the copolymer (II) are represented as $[a_2]$ and $[c_2]$ respectively. Further, the copolymer (I)/the copolymer (II) is [mass ratio of the copolymer (I)]/[mass ratio of the copolymer (II)]. Further, the respective mass ratios of polymerized units in the total copolymers (the copolymer (I)+the copolymer (II)) are represented as [a], [b], [c] and [d], respectively.

Further, numerals in ( ) in Table 9 are solid component concentrations at a time of mixing.

TABLE 9

| Example | | 25 | 26 | 27 | 28 | 29 |
|---|---|---|---|---|---|---|
| Production Example | Copolymer (I) | 24 (30) | 25 (30) | 24 (30) | 25 (30) | 26 |
| | Copolymer (II) | 22 (70) | 22 (70) | 23 (70) | 23 (70) | |
| Combine agent | M-3/ACX | ○ | ○ | ○ | ○ | ○ |
| Additive (IV) (mass %) | AGE-4 | 1 | 1 | 1 | 1 | 1 |
| Copolymer (I) | $[a_1]$ (mass %) | 70 | 70 | 70 | 70 | — |
| | $[b_1]$ (mass %) | 27 | 27 | 27 | 27 | — |
| Copolymer (II) | $[a_2]$ (mass %) | 30 | 30 | 30 | 30 | — |
| | $[c_2]$ (mass %) | 3 | 3 | 3 | 3 | — |
| $[a_1] - [a_2]$ | | 40 | 40 | 40 | 40 | — |
| Copolymer (I)/Copolymer (II) | | 30/70 | 30/70 | 30/70 | 30/70 | — |
| Copolymer (I) + (II) | [a] (mass %) | 42 | 42 | 42 | 42 | 40 |
| | [b] (mass %) | 55 | 55 | 55 | 55 | 57 |
| | [c] (mass %) | 3 | 3 | 3 | 3 | 3 |
| | [d] (mass %) | 0 | 0 | 0 | 0 | 0 |

Evaluation of Laundering Durability (HL-5)

Laundering was repeated five times in accordance with the water laundering method of JIS-L0217 attached list 103. Test clothes were dried at a room controlled at 25° C. and 55% of humidity for one day, and then water repellency was evaluated in accordance with the above mentioned evaluation method.

Evaluation results are shown in Table 10.

TABLE 10

| Example | | 25 | 26 | 27 | 28 | 29 |
|---|---|---|---|---|---|---|
| PET | Initial | 100 | 100 | 100 | 100 | 90+ |
| | HL-5 | 90 | 90 | 90 | 90 | 70+ |
| cotton | Initial | 100 | 100 | 100 | 100 | 90 |
| | HL-5 | 90 | 90 | 90+ | 90 | 80+ |

Evaluation Method of Abrasion Resistance Test

Abrasion resistance test was carried out by applying a load of 28 gf per 1 cm$^2$ in accordance with the method described in JIS-L-1076 (C). For the test, treated nylon clothes prepared in the same manner as in Example 6, except that the nylon clothes prepared in Examples 3, 6 and 11 (Examples) and AG-415 (manufactured by Asahi Glass Company, Limited), were used.

Then, the respective treated clothes were washed repeatedly in the same manner as in the above laundering durability test and dried at 90° C. for 15 minutes to prepare test clothes. With respect to the test clothes, elemental analysis on a cloth surface was carried out by X-ray spectrometry. Results of fluorine element concentration measurement were shown in Table 11.

TABLE 11

|  | Ex. 3 | Ex. 6 | Ex. 11 | AG415 |
|---|---|---|---|---|
| No abrasion | 53 | 52 | 53 | 56 |
| Abrasion after wash | 48 | 50 | 49 | 43 |
| Reduction amount (%) | 9 | 4 | 8 | 23 |

In Examples 17 and 18 wherein only the copolymer (I) was used, although initial liquid repellency was very high, liquid repellency substantially deteriorated after laundering; the durability was low (Tables 7 and 8). Also in Examples 19 and 20 wherein only the copolymer (II) was used, both liquid repellency and durability were not established. Further, in Example 29 wherein the copolymer containing the polymerized units (a), (b) and (c) in one particle was used, sufficient liquid repellency was not obtained, and durability was low (Table 10).

On the other hand, in Examples 25 to 28, although the total ratio of respective polymerized units contained in the total copolymers was the same as in Example 29, sufficient liquid repellency and durability were obtained (Table 10). Consequently, in a case where the copolymers (I) and the copolymers (II) were mixed as separate particles and used, sufficient liquid repellency and high durability were confirmed. Further, in Examples 1 to 5 and 22 to 24 wherein the copolymers (I) and the copolymers (II) were mixed as separate particles and used in the same manner, sufficient liquid repellency and high durability were obtained. Further, in a case where the copolymers (I) and the copolymers (II) in the form of the core-shell type was used (Examples 6 to 13, 15, 16 and 21), sufficient liquid repellency and high durability were obtained.

Further, in a liquid repellent film formed from the liquid repellent composition of the present invention, surface change is low, and durability is high.

As mentioned above, by using the liquid repellent composition of the present invention containing the copolymer (I) and the copolymer (II), a liquid repellent film excellent in liquid repellency and durability can be is formed.

With respect to the respective additives used in examples, results of thermogravimetric analysis are shown in Table 1. For the analysis, TG-DTA 2000S, manufactured by Bruker AXS K.K. was used. 10 mg of an additive to be measured was taken in a deep dish aluminum vessel (Φ: 5.2 mm, height: 5.1 mm), and weight change was measured at a time of raising temperature from room temperature to 400° C. at as rate of 10° C./minute.

As Example 6 is example, change of dynamic surface tension depending on the presence or absence of an additive, is shown in Table 2. The measurement was carried out by means of FACE BP=D3, manufactured by Kyowa Interface Science Co., LTD.

INDUSTRIAL APPLICABILITY

The liquid repellent composition of the present invention has sufficient water repellency and oil repellency, durability, etc. and practically required functions. It is estimated that these properties are obtained by synergic effects of improvement of surface alignment of the R$^f$ group and solidification of the R$^f$ group.

By using the water and oil repellent agent (liquid repellent agent) based on this principle, a coating film can be formed at a lower temperature, compared to conventional water and oil repellent agents, and a coating film to be obtained is flexible, strong and excellent in an adherence property to a substrate. Therefore, water and oil repellency can be imparted to articles without conventional problems of deterioration of properties such as hard hand or fading of a coating film. Further, sufficient water repellency and oil repellency can be imparted to articles to be obtained by processing at a lower temperature than ever. Further, deterioration of properties due to abrasion, laundering etc. can be prevented. Further, adhesion at a time of laminate processing and coating processing is remarkably improved, compared to conventional water and oil repellent agents. Further, since the copolymers of the present invention have preferable solubility to alcohol solvents, slow solvents, fluorosolvents with less influence on ozone layer such as hydrofluorocarbons, etc., mediums which are easy to environment and safe can be used as a solvent.

Further, the liquid repellent composition of the present invention can be used for water and oil repellency treatments to clothes such as sports wears, coats, jackets, work clothes and uniforms, fiber products such as bags and industrial materials, non woven fabrics, building stones, concrete building materials, etc. Further, the liquid repellent composition of the present invention can be used as a coating material for filtration materials used with organic solvent liquid or its steam, a surface protective agent, a coating agent for electronics and antifouling coating agent. Further, the liquid repellent composition of the present invention can be mixed with a polypropylene, nylon, etc. and molded to fiber, whereby water repellency and oil repellency can be imparted.

The entire disclosure of Japanese Patent Application No. 2006-092929 filed on Mar. 30, 2006, including specification, claims, drawings and summary are incorporated herein by reference in their entireties.

What is claimed is:

1. A liquid repellent composition comprising a copolymer (I) and a copolymer (II), wherein the copolymer (I) comprises from 65 to 95 mass % of a polymerized unit (a), from 1 to 30 mass % of a polymerized unit (b), and from 0.1 to 20 mass % of a polymerized unit (d) based on the mass of the copolymer (I), wherein polymerized units of a monomer comprising a polyfluoroalkyl group having 7 or more carbon atoms are excluded, and the copolymer (I) does not comprise a polymerized unit (c);

the copolymer (II) comprises from 25 to 80 mass % of a polymerized unit (a) and from 1 to 50 mass % of a polymerized unit (c) based on the mass of the copolymer (II), wherein the copolymer (II) further comprises a polymerized unit (b) and a polymerized unit (d);

when a mass ratio of the polymerized unit (a) in the copolymer (I) to the copolymer (I) is $[a_1]$, and a mass ratio of the polymerized unit (a) in the copolymer (II) to the copolymer (II) is $[a_2]$, $[a_1]-[a_2] \geq 10$ (mass %); and the copolymer (I) and the copolymer (II) are contained in a ratio of [mass ratio of the copolymer (I)]/[mass ratio of the copolymer (11)]=10/90 to 95/5:

polymerized unit (a): a polymerized unit derived from a monomer represented by $(Z_A-Y_A)_nX_A$ provided that $Z_A$ is a polyfluoroalkyl group having at most 6 carbon atoms, n is 1 or 2, provided that when n is 2, two $(Z_A-Y_A)$ may be the same or different, $X_A$ is —CR=CH$_2$, —COOCR=CH$_2$, —OCOCR=CH$_2$, —OCH$_2$—N—CR=CH$_2$ or —OCH=CH$_2$ when n is 1, and =CH(CH$_2$)$_m$CR=CH$_2$, =CH(CH$_2$)$_m$COOCR=CH$_2$, =CH(CH$_2$)$_m$OCOCR=CH$_2$ or —OCOCH=CHCOO— when n is 2, wherein R is a hydrogen atom, a methyl group or a halogen atom, N is a phenylene group, and m is an integer of from 0 to 4, and $Y_A$ is a bivalent organic group or a single bond;

polymerized unit (b): a polymerized unit derived from a monomer represented by $Z_B-X_B$ provided that $Z_B$ is a hydrocarbon group having at least 14 carbon atoms, and $X_B$ is the same as $X_A$;

polymerized unit (c): a polymerized unit derived from a monomer having no polyfluoroalkyl group and having a cross-linkable functional group;

nonionic surfactant made of a compound having at least one carbon-carbon triple bond and at least one hydroxyl group in its molecule; and polymerized unit (d): a polymerized unit derived from a monomer having a polymerizable group, other than the polymerized units (a), (b) and (c).

2. The liquid repellent composition according to claim 1, further comprising a surfactant (e3):

Surfactant (e3): a cationic surfactant represented by formula $s^{71}$:

$$[(R^{21})_4N^+].X^- \qquad \text{(formula } s^{71}),$$

wherein $R^{21}$ is a hydrogen atom, a $C_{1-22}$ alkyl group, a $C_{2-22}$ alkenyl group, a $C_{1-9}$ fluoroalkyl group or a polyoxyalkylene chain having a hydroxyl group at a terminal, four $R^{21}$ may be the same or different, provided that four $R^{21}$ may not be hydrogen atoms at the same time, and $X^-$ is a counter ion.

3. A liquid repellent processing method, comprising applying to a surface, the liquid repellent composition as defined in claim 1.

4. An article comprising a liquid repellent film formed by means of the liquid repellent composition as defined in claim 1.

5. The liquid repellent composition according to claim 1, wherein $Z_A$ is a polyfluoroalkyl group wherein at least from 20 to 80% of hydrogen atoms in an alkyl group of the polyfluoroalkyl group are substituted by fluorine.

6. The liquid repellent composition according to claim 1, wherein $Z_A$ is at least one group selected from the group consisting of F(CF$_2$)$_4$—, F(CF$_2$)$_5$—, F(CF$_2$)$_6$—, (CF$_3$)$_2$CF(CF$_2$)$_2$—, H(CF$_2$)$_6$—, HCF$_2$CF$_2$—, Cl(CF$_2$)$_4$— and CF$_3$CF=CFCF$_2$CF=CF—.

7. The liquid repellent composition according to claim 1, wherein $Z_B$ is at least one group selected form the group consisting of a tetradecyl group, a cetyl group, a heptadecyl group, a stearyl group, an icosyl group, a behenyl group, a lauroyl group, a tetracocyl group, a montanyl group and a stearoyl group.

8. The liquid repellent composition according to claim 1, wherein a content of the polymerized unit (a) in copolymer (I) is 70 to 90 mass %.

9. The liquid repellent composition according to claim 1, wherein a content of the polymerized unit (a) in copolymer (II) is 30 to 75 mass %.

10. The liquid repellent composition according to claim 1, wherein a content of the polymerized unit (c) in copolymer (II) is 1 to 35 mass %.

11. The liquid repellent composition according to claim 1, wherein the copolymer (I) and the copolymer (II) exist as separate particles.

12. The liquid repellent composition according to claim 1, wherein the copolymer (I) and the copolymer (II) exist in the same particle.

13. The liquid repellent composition according to claim 12, wherein the copolymer (I) and the copolymer (II) exist as a core-shell structure.

14. The liquid repellent composition according to claim 12, wherein the copolymer (I) and the copolymer (II) exist as sea-island structure.

15. The liquid repellent composition according to claim 13, wherein the copolymer (II) is a shell part.

16. The liquid repellent composition according to claim 1, wherein $Z_A$ is a polyfluoroalkyl group having from 4 to 6 carbon atoms.

17. The liquid repellent composition according to claim 1, wherein $Z_A$ is a polyfluoroalkyl group having 6 carbon atoms.

18. The liquid repellent composition according to claim 1, wherein the copolymer (I) and the copolymer (II) are dispersed in a medium comprising water and at least one compound selected from the group consisting of a glycol and a glycol ether.

19. The liquid repellent composition according to claim 1, wherein the copolymer (I) and the copolymer (II) are dispersed in a medium comprising water and dipropylene glycol.

20. The liquid repellent composition according to claim 2, further comprising a surfactant (e1):

Surfactant (e1): at least one surfactant selected from a polyoxyalkylene monoalkyl ether, a polyoxyalkylene monoalkenyl ether, a polyoxyalkylene monoalkapolyenyl ether and a polyoxyalkylene monopolyfluoroalkyl ether.

21. The liquid repellent composition according to claim 1, wherein $[a_1]-[a_2]$ is 16 mass % or less.

22. The liquid repellent composition according to claim 1, wherein the polymerized units (a) included in the copolymer (I) and the copolymer (II) are derived from $C_6F_{13}C_2H_4OCOC(CH_3)$=CH$_2$, the polymerized units (c) included in the copolymer (II) are derived from 3,5-dimethyl pyrazole adduct of 2-isocyanate ethyl methacrylate, and the polymerized units (d) included in the copolymer (I) and the copolymer (II) are derived from vinyl chloride.

* * * * *